US008508696B2

(12) United States Patent
Kim et al.

(10) Patent No.: US 8,508,696 B2
(45) Date of Patent: Aug. 13, 2013

(54) POLARIZING PLATE AND DISPLAY APPARATUS HAVING THE SAME

(75) Inventors: Kwang-Hyun Kim, Guri-si (KR); Ki-Chul Shin, Asan-si (KR); Seung-Hee Lee, Seoul (KR); Ji-Hoon Kim, Cheonan-si (KR); Sang-Jae Kim, Asan-si (KR)

(73) Assignee: Samsung Display Co., Ltd. (KR)

( * ) Notice: Subject to any disclaimer, the term of this patent is extended or adjusted under 35 U.S.C. 154(b) by 247 days.

(21) Appl. No.: 12/845,637

(22) Filed: Jul. 28, 2010

(65) Prior Publication Data

US 2011/0085113 A1 Apr. 14, 2011

(30) Foreign Application Priority Data

Oct. 5, 2009 (KR) ........................ 10-2009-0094226

(51) Int. Cl.
*G02F 1/1335* (2006.01)
(52) U.S. Cl.
USPC ............. 349/96; 349/118; 349/119; 349/121
(58) Field of Classification Search
USPC .................................................. 349/96, 102
See application file for complete search history.

(56) References Cited

U.S. PATENT DOCUMENTS

2004/0212767 A1* 10/2004 Sasaki et al. .................. 349/118
2005/0151896 A1* 7/2005 Hara et al. ...................... 349/96
2005/0225706 A1* 10/2005 Miyachi et al. ............... 349/117
2006/0119766 A1 6/2006 Mi et al.
2006/0274229 A1* 12/2006 Ito et al. .......................... 349/96
2007/0165165 A1* 7/2007 Joten .............................. 349/119
2008/0018834 A1* 1/2008 Matsushima et al. ........... 349/98
2009/0002580 A1* 1/2009 Matsushima et al. ........... 349/12
2009/0161044 A1 6/2009 Ge et al.
2010/0208176 A1* 8/2010 Ge et al. ........................... 349/98

FOREIGN PATENT DOCUMENTS

| JP | 2003-035820 A | 7/2003 |
| JP | 2008-040456 A | 2/2008 |
| KR | 1020030011572 A | 2/2003 |
| KR | 1020080010323 A | 1/2008 |

* cited by examiner

*Primary Examiner* — Edward Glick
*Assistant Examiner* — Dennis Y Kim
(74) *Attorney, Agent, or Firm* — Innovation Counsel LLP

(57) ABSTRACT

A display apparatus comprises a display panel, a first polarizing plate and a second polarizing plate. The display panel comprises a first substrate including a pixel electrode, a second substrate opposite to the first substrate, and a liquid crystal layer disposed between a first surface of the first substrate and a first surface of the second substrate. The first polarizing plate comprises a first polarizer having a first polarizing axis, and a first λ/4 phase difference plate having a refractive index between about 1.35 and about 2.05 in a thickness direction. The second polarizing plate comprises a second polarizer having a second polarizing axis crossing the first polarizing axis, and a second λ/4 phase difference plate having a refractive index between about 1.35 and about 2.05 in a thickness direction. Accordingly, light leakage in a side view may be reduced and viewing angle may be improved.

9 Claims, 26 Drawing Sheets

POLARIZING PLATE AND DISPLAY APPARATUS HAVING THE SAME

PRIORITY STATEMENT

This application claims priority to Korean Patent Application No. 10-2009-94226, filed on Oct. 5, 2009, and all the benefits accruing therefrom under 35 U.S.C. §119, the contents of which are herein incorporated by reference in their entirety.

BACKGROUND OF THE INVENTION

1. Field of the Invention

Example embodiments of the present invention relate to flat panel displays. More particularly, example embodiments of the present invention relate to a flat panel display polarizing plate capable of improving display quality and the display apparatus having the polarizing plate.

2. Description of the Related Art

Liquid crystal displays (LCDs) have seen increasing popularity for their relatively small thicknesses, light weight, and low power consumption, making them desirable for use in many different devices, such as monitors, laptop computers, cellular phones, and so on. Recently, LCDs have also been used in digital information displays (DIDs). The DID is a display apparatus commonly used in providing information in public places such as airports, subway stations, shopping malls, theaters, and the like. The DID may display various digital information similar to a conventional signboard.

The typical LCD apparatus includes an LCD panel displaying images according to the light transmittance of a liquid crystal, and a backlight assembly disposed under the LCD panel to provide light to the LCD panel.

The typical LCD panel includes a first substrate, a second substrate opposite to the first substrate and having a common electrode, and a liquid crystal layer disposed between the first and second substrates. The liquid crystal has an anisotropic refractive index, so that the liquid crystal induces a phase difference in light generated from the backlight assembly, where the magnitude of the phase difference depends on the incident angle of the light.

For example, when the LCD apparatus includes the liquid crystal layer in a vertical alignment (VA) mode, incident light that is perpendicular to the liquid crystal layer passes through the liquid crystal with no phase difference, but light that is obliquely incident to the liquid crystal layer may have a phase difference imparted. In this manner, LCD panels often both refract, and generate a phase difference in non-perpendicular emitted light.

Thus, the amount of light from a side view is different from the amount of light from a front view, so that at some viewing angles, light leakage occurs. Accordingly, in LCD apparatuses with a liquid crystal layer in VA mode, a contrast ratio (CR) varies in accordance with the viewing angle. For example, the LCD apparatus displays images having a high CR in straight-on front views, and images having a low CR in side views.

BRIEF SUMMARY OF THE INVENTION

Example embodiments of the present invention provide a polarizing plate capable of improving a viewing angle.

Example embodiments of the present invention provide a display apparatus having the polarizing plate.

According to one aspect of the present invention, a polarizing plate comprises a polarizer and a $\lambda/4$ phase difference plate. The polarizer has a polarizing axis. The $\lambda/4$ phase difference plate is disposed over the polarizer and has a refractive index between about 1.35 and about 2.05 in a thickness direction.

In an example embodiment of the present invention, the polarizing plate may further comprise a compensating film disposed between the polarizer and the $\lambda/4$ phase difference plate.

In an example embodiment of the present invention, the compensating film may be a positive A-plate, and a phase delay value of the positive A-plate is between about 70 nm and about 140 nm in a thickness direction.

In an example embodiment of the present invention, the compensating film may be a negative C-plate, and a phase delay value of the negative C-plate is between about 30 nm and about 80 nm in a thickness direction.

In an example embodiment of the present invention, the refractive index may be between about 1.65 and about 1.75.

According to another aspect of the present invention, a polarizing plate comprises a polarizer, a $\lambda/4$ phase difference plate, a positive A-plate and a negative C-plate. The polarizer has a polarizing axis. The $\lambda/4$ phase difference plate is disposed over the polarizer and has a refractive index between about 1.35 and about 2.05 in a thickness direction. The positive A-plate is disposed between the polarizer and the $\lambda/4$ phase difference plate. The negative C-plate is disposed between the positive A-plate and the polarizer.

According to still another aspect of the present invention, a polarizing plate comprises a polarizer, a $\lambda/4$ phase difference plate, a positive A-plate and a negative C-plate. The polarizer has a polarizing axis. The $\lambda/4$ phase difference plate is disposed over the polarizer and has a refractive index between about 1.35 and about 2.05 in a thickness direction. The negative C-plate is disposed between the polarizer and the $\lambda/4$ phase difference plate. The positive A-plate is disposed over the negative C-plate.

According to still another aspect of the present invention, a display apparatus comprises a display panel, a first polarizing plate and a second polarizing plate. The display panel comprises a first substrate including a pixel electrode, a second substrate opposite to the first substrate, and a liquid crystal layer disposed between a first surface of the first substrate and a first surface of the second substrate. The first polarizing plate comprises a first polarizer disposed under a second surface of the first substrate and having a first polarizing axis and a first $\lambda/4$ phase difference plate disposed between the second surface of the first substrate and the first polarizer and having a refractive index between about 1.35 and about 2.05 in a thickness direction. The second polarizing plate comprises a second polarizer disposed over a second surface of the second substrate and having a second polarizing axis crossing the first polarizing axis and a second $\lambda/4$ phase difference plate disposed between the second surface of the second substrate and the second polarizer and having refractive index between about 1.35 and about 2.05 in a thickness direction.

In an example embodiment of the present invention, a phase delay value of the liquid crystal layer may be from about 275 nm to about 350 nm at a wavelength of about 550 nm.

In an example embodiment of the present invention, the first polarizing plate may further comprise a compensating film disposed between the first polarizer and the first $\lambda/4$ phase difference plate so as to compensate for a phase difference generated by the liquid crystal layer.

In an example embodiment of the present invention, the refractive index of at least one of the first $\lambda/4$ phase difference plate and the second λ/4 phase difference plate may be between about 1.65 and about 1.75.

According to still another aspect of the present invention, a display apparatus comprises a display panel, a first polarizing plate and a second polarizing plate. The display panel comprises a first substrate including a pixel electrode, a second substrate opposite to the first substrate, and a liquid crystal layer disposed between a first surface of the first substrate and a first surface of the second substrate. The first polarizing plate comprises a first polarizer disposed under a second surface of the first substrate and having a first polarizing axis, a first λ/4 phase difference plate disposed between the second surface of the first substrate and the first polarizer and having a refractive index between about 1.35 and about 2.05 in a thickness direction, a positive A-plate disposed between the first polarizer and the first λ/4 phase difference plate and a negative C-plate disposed between the first polarizer and the first λ/4 phase difference plate. The second polarizing plate comprises a second polarizer disposed over a second surface of the second substrate and having a second polarizing axis crossing the first polarizing axis and a second λ/4 phase difference plate disposed between the second surface of the second substrate and the second polarizer and having refractive index between about 1.35 and about 2.05 in a thickness direction.

In an example embodiment of the present invention, the positive A-plate may be disposed over the first polarizer. The negative C-plate may be disposed over the positive A-plate.

In an example embodiment of the present invention, the negative C-plate may be disposed over the first polarizer. The positive A-plate may be disposed over the negative C-plate.

In an example embodiment of the present invention, the refractive index of at least one of the first λ/4 phase difference plate and the second λ/4 phase difference plate may be between about 1.65 and about 1.75.

According to the present invention, first and second λ/4 phase difference plates are disposed over and under a display panel and refractive indexes of the first and second λ/4 phase difference plates in thickness directions are adjusted so that light leakage in a side view may be decreased. This results in improved viewing angle of the display apparatus.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

Figure 1:
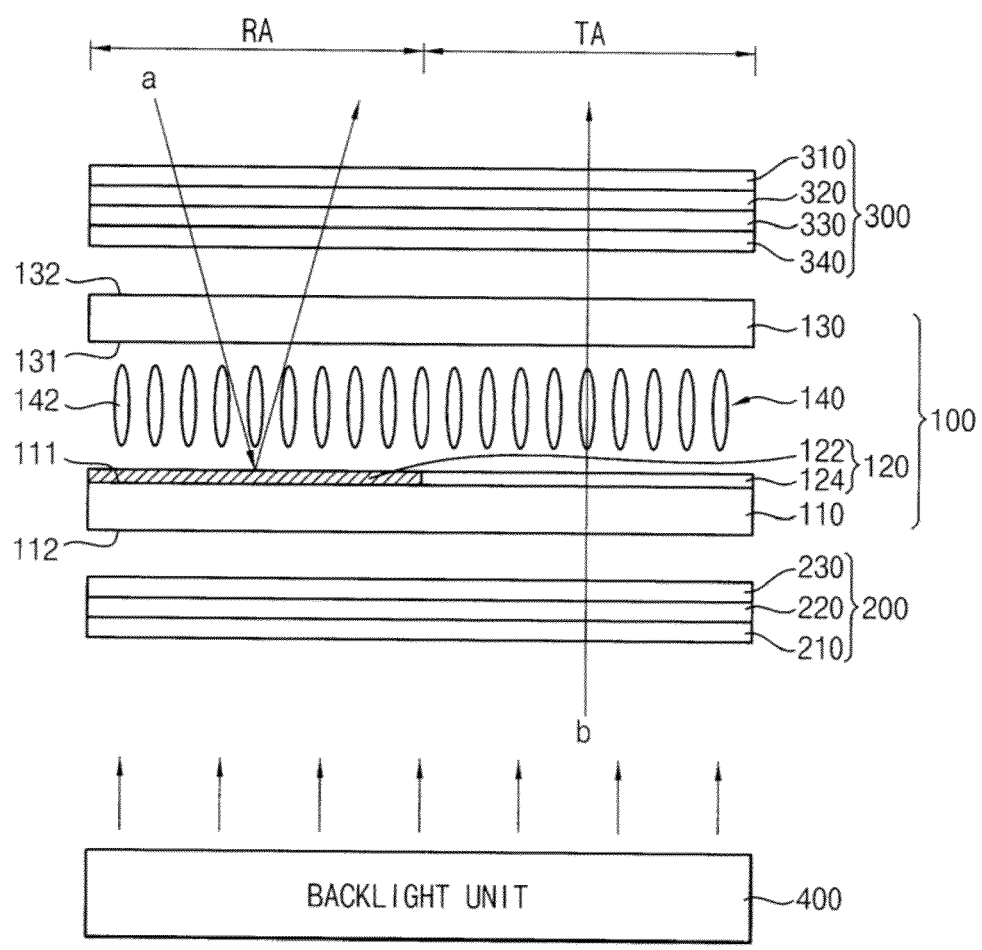
FIG. 1 is a cross sectional view illustrating a display apparatus according to an example embodiment of the present invention.

The present invention is described more fully hereinafter with reference to the accompanying drawings, in which exemplary embodiments of the present invention are shown. The present invention may, however, be embodied in many different forms and should not be construed as limited to the exemplary embodiments set fourth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the apparatus in use or operation in addition to the orientation depicted in the figures. For example, if the apparatus in the figures is turned over, elements described as "lower" other elements or features would then be oriented "upper" the other elements or features. Thus, the exemplary term "lower" can encompass both an orientation of above and below. The apparatus may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of an apparatus and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Embodiments of the invention utilize display panels that employ at least one $\lambda/4$ phase difference plate and polarizer. In addition to acting as circular polarizers, the one or more $\lambda/4$ phase difference plates each have a specified refractive index. When the values of these refractive indices are chosen correctly, light leakage of the display panel is reduced. In addition to the $\lambda/4$ phase difference plates, the display panels can also employ one or more compensating films with specified phase delays. If the phase delay is chosen correctly, light leakage can be further reduced, and be made more symmetric.

Hereinafter, the present invention will be explained in detail with reference to the accompanying drawings.

FIG. 1 is a cross sectional view illustrating a display apparatus according to an exemplary embodiment of the present invention.

Referring to FIG. 1, the display apparatus according to the present invention includes a display panel 100, a first polarizing plate 200, a second polarizing plate 300 and a backlight unit 400.

The display panel 100 includes a first substrate 110, a second substrate 130 opposite to the first substrate 110, and a liquid crystal layer 140 disposed between the first substrate 110 and the second substrate 130.

The first substrate 110 further includes a pixel electrode 120. The pixel electrode 120 is disposed in a pixel area defined by a gate line (not shown) and a data line (not shown) crossing each other. The pixel area includes a reflective area RA and a transmissive area TA. The pixel electrode 120 includes a reflective electrode 122 and a transparent electrode 124. The reflective electrode 122 is disposed in the reflective area RA and includes a conductive reflective material. The transparent electrode 124 is disposed in the transmissive area TA and includes a transparent conductive material. The first substrate 110 includes a first surface 111 facing the liquid crystal layer 140 and a second surface 112 opposite to the first surface 111.

The second substrate 130 includes a plurality of color filters (not shown) and a common electrode (not shown) disposed on the color filters. The color filters may include red color filters, green color filters and blue color filters, or any other desired group of colors. The common electrode includes a transparent conductive material. A common voltage is applied to the common electrode. The second substrate 130 includes a first surface 131 facing the liquid crystal layer 140 and a second surface 132 opposite to the first surface 131.

The liquid crystal layer 140 is disposed between the first surface 111 of the first substrate 110 and a first surface 131 of the second substrate 130. The liquid crystal layer 140 may be driven in a vertical alignment (VA) mode. The liquid crystal layer 140 includes a plurality of liquid crystal molecules 142. The liquid crystal molecules 142 are aligned substantially perpendicular to the first and second substrates 110 and 130. When an electric field is applied, the liquid crystal molecules 142 may be aligned substantially parallel with the first and second substrates 110 and 130.

The first polarizing plate 200 is attached to the second surface 112 of the first substrate 110. The first polarizing plate 200 may include a first protection layer 210, a first polarizer 220 and a first $\lambda/4$ phase difference plate 230.

The first protection layer 210 is disposed under the first polarizer 220 so that the first protection layer 210 protects the first polarizer 220. The first protection layer 210 may include a material having durability and a non-optical configuration. For example, the first protection layer 210 may include a tri-acetyl cellulose (TAC) film.

The first polarizer 220 is disposed over the first protection layer 210. For example, the first polarizer 220 may include poly vinyl alcohol (PVA) and a dichromatic material such as iodine ($I_2$) and chlorine ($Cl_2$) polarizing light to a specific direction in PVA.

The first λ/4 phase difference plate 230 is disposed between the first substrate 110 and the first polarizer 220. The first λ/4 phase difference plate 230 delays the light incident from the first polarizer 220 by a λ/4 phase. The first λ/4 phase difference plate 230 may have a refractive index nz between about 1.35 and about 2.05 in a thickness direction.

The first protection layer 210, the first polarizer 220 and the first λ/4 phase difference plate 230 may be attached to one another by an adhesive material (not shown).

The second polarizing plate 300 is attached on the display panel 100. The second polarizing plate 300 may include a low-reflective film 310, a second protection layer 320, a second polarizer 330, and a second λ/4 phase difference plate 340.

The low-reflective film 310 is disposed over the second protection layer 320. The low-reflective film 310 includes a material having relatively low refractivity, so that the low-reflective film 310 reduces a reflective ratio of external light a. The reflective ratio of the low-reflective film 310 may be less than about 1%. Accordingly, glare by the reflection may be largely prevented.

The second protection layer 320 is disposed over the second polarizer 330 so that the second protection layer 320 protects the second polarizer 330. The second protection layer 320 may include a TAC film.

The second polarizer 330 is disposed under the second protection layer 320. For example, the second polarizer 330 may include poly vinyl alcohol (PVA) and a dichromatic material such as $I_2$ and/or $Cl_2$, polarizing the light according to a specific direction in the PVA.

The second λ/4 phase difference plate 340 is disposed between the second substrate 130 and the second polarizer 330. The second λ/4 phase difference plate 340 delays the light incident from the second substrate 130 by λ/4. The second λ/4 phase difference plate 340 may have a refractive index nz between about 1.35 and about 2.05 in a thickness direction.

The low-reflective film 310, the second protection layer 320, the second polarizer 330 and the second λ/4 phase difference plate 340 may be attached to one another by one or more adhesive materials (not shown).

The backlight unit 400 is disposed under the first polarizing plate 200. A generated light b from the backlight unit 400 is transmitted through the first polarizing plate 200, the display panel 100 and the second polarizing plate 300 in sequence, so that images are displayed.

Figure 2:
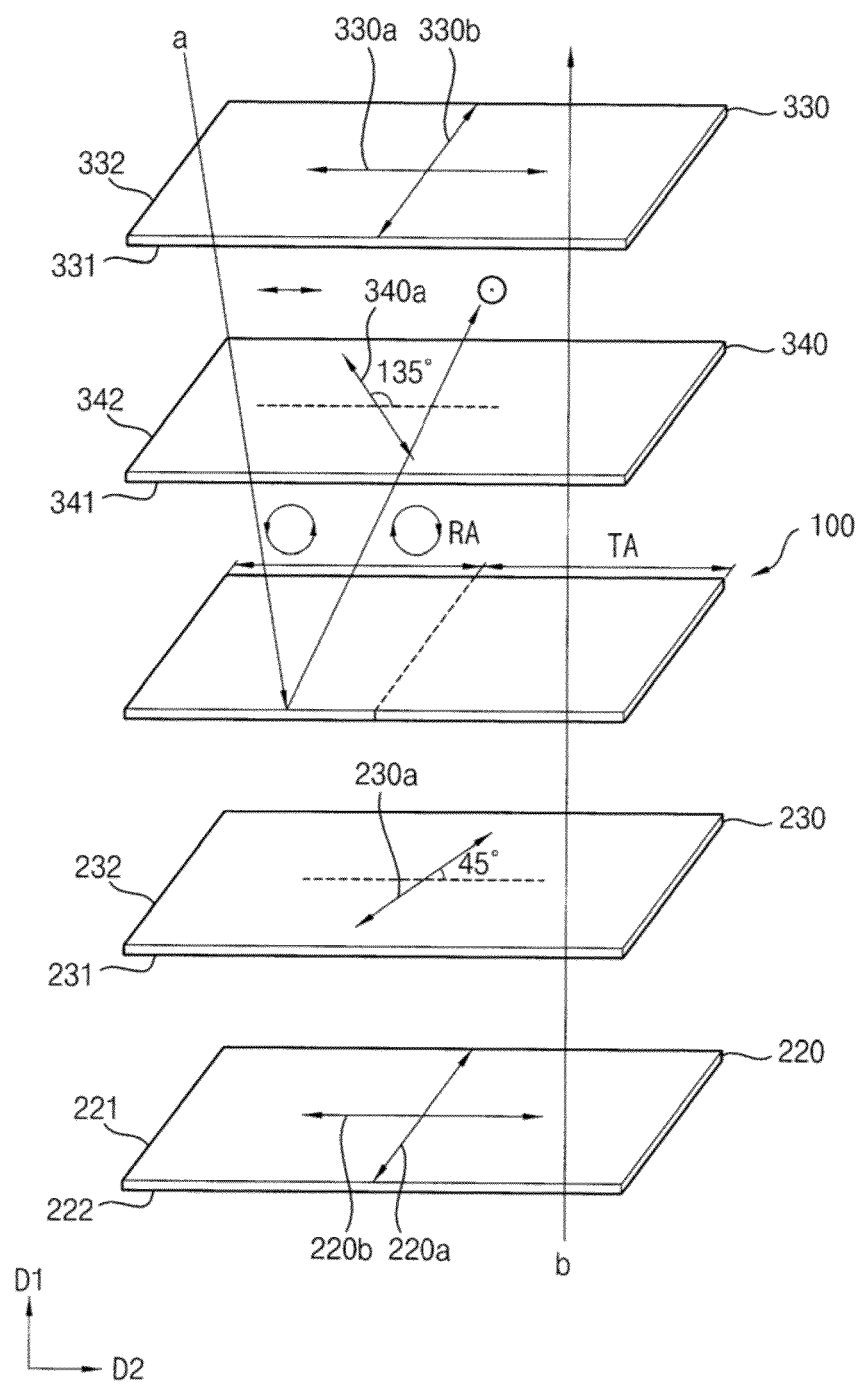
FIG. 2 is a conceptual diagram illustrating an optical operation of the display apparatus of FIG. 1.

FIG. 2 is a conceptual diagram illustrating an optical operation of the display apparatus of FIG. 1.

Referring to FIGS. 1 and 2, the first polarizer 220 has a first absorptive axis 220a substantially parallel to a first direction D1, and a first polarizing axis 220b substantially parallel to a second direction D2. Here, second direction D2 is substantially perpendicular to the first direction D1. The first polarizer 220 includes a first surface 221 and a second surface 222 opposite to the first surface 221.

The first λ/4 phase difference plate 230 is disposed between the first surface 221 of the first polarizer 220 and the second surface 112 of the first substrate 110. The first λ/4 phase difference plate 230 includes a first surface 231 facing the first surface 221 of the first polarizer 220, and a second surface 232 facing the second surface 112 of the first substrate 110. The first λ/4 phase difference plate 230 has a first delaying axis 230a inclined by an angle of about 45 degrees or about 135 degrees with respect to the first polarizing axis 220b of the first polarizer 220.

The display panel 100 includes first substrate 110, second substrate 130, and liquid crystal layer 140 disposed between the first substrate 110 and the second substrate 130. A phase delay value Δnd of the liquid crystal layer 140 may be from about 275 nm to about 350 nm at a wavelength of about 550 nm. For example, the phase delay value Δnd of the liquid crystal layer 140 may be about 325 nm. The Δn is an anisotropic refractive index of the liquid crystal layer 140 and d is a cell gap of the liquid crystal layer 140.

The second λ/4 phase difference plate 340 is disposed over the display panel 100. In detail, the second λ/4 phase difference plate 340 is disposed over the second surface 132 of the second substrate 130. The second λ/4 phase difference plate 340 includes a first surface 341 facing the second surface 132 of the second substrate 130, and a second surface 342 facing the first surface 331 of the second polarizer 330. The second λ/4 phase difference plate 340 has a second delaying axis 340a substantially perpendicular to the first delaying axis 230a. The second delaying axis 340a is inclined by an angle of about 45 degrees, or about 135 degrees with respect to a second polarizing axis 330b of the second polarizer 330.

The first and second λ/4 phase difference plates 230 and 340 may have a refractive index nz between about 1.35 and about 2.05 in a thickness direction corresponding to the liquid crystal layer 140, with a corresponding phase delay value Δnd of about 275 nm to about 350 nm at a wavelength of about 550 nm.

The second polarizer 330 is disposed over the second surface 342 of the second λ/4 phase difference plate 340. The second polarizer 330 has a second absorptive axis 330a substantially perpendicular to the first absorptive axis 220a, and a second polarizing axis 330b substantially perpendicular to the second absorptive axis 330a.

The above-described structure helps reduce reflection of the external light a from the surface of the display panel 100. For example, by passing through the second polarizer 330, the external light a is linearly polarized substantially parallel with the second polarizing axis 330b of the second polarizer 330. The linearly polarized light is converted to circularly polarized light by the second λ/4 phase difference plate 340. The circularly polarized light then falls incident to the display panel, where it is reflected by the surface of the display panel 100. The reflected light is polarized linearly, and entirely blocked by the second polarizer 330. Therefore, glare due to reflection of external light a is reduced by the presence of the second λ/4 phase difference plate 340.

The display panel 100 may be driven in reflective mode or transmissive mode. That is, the invention encompasses both driving modes.

First, when the display panel 100 is driven in reflective mode, external light a passes through the second polarizer 330 and the second λ/4 phase difference plate 340, thus becoming circularly polarized. The external light a is then incident to the display panel 100. When a voltage is not applied to the liquid crystal layer 140, the liquid crystal molecules 142 of the liquid crystal layer 140 are aligned substantially perpendicular to the first and second substrates 110 and 130, so that the circularly polarized light simply passes through the liquid crystal layer 140 without any modification. The circularly polarized light passing through the liquid crystal layer 140 is then reflected by the reflective electrode 122 and converted to linearly polarized light by the second λ/4 phase difference plate 340. The axis of the linearly polarized light is substantially parallel with the second absorptive axis 330a of the second polarizer 330, so that the linearly polarized light is absorbed by the second polarizer 330. The display panel 100 thus displays black.

In contrast, when a voltage is applied to the liquid crystal layer 140, the liquid crystal molecules 142 of the liquid crystal layer 140 are aligned substantially parallel with the first and second substrates 110 and 130, so that the circularly polarized light passing through the liquid crystal layer 140 is converted to linearly polarized light. The linearly polarized light is then reflected by the reflective electrode 122. By passing through the liquid crystal layer 140 again, the linearly polarized light is converted to circularly polarized light. This circularly polarized light is converted to linearly polarized light by the second λ/4 phase difference plate 340, and transmitted through the second polarizer 330. The display panel 100 thus displays white.

Second, when the display panel 100 is driven in transmissive mode, generated light b from backlight unit 400 passes through the first polarizer 220 and the first λ/4 phase difference plate 230, and is converted to circularly polarized light. The circularly polarized light is applied to the display panel 100, where it is applied to the liquid crystal layer 140 via the transparent electrode 124. When a voltage is not applied to the liquid crystal layer 140, the liquid crystal molecules 142 of the liquid crystal layer 140 are aligned substantially perpendicular to the first and second substrates 110 and 130, so that the circularly polarized light simply passes through the liquid crystal layer 140 without any modification. The circularly polarized light is then converted to linearly polarized light by the second λ/4 phase difference plate 340. The axis of the linearly polarized light is substantially parallel with the second absorptive axis 330a of the second polarizer 330, so that the linearly polarized light is absorbed by the second polarizer 330. The display panel 100 thus displays black.

Alternatively, when a voltage is applied to the liquid crystal layer 140, the liquid crystal molecules 142 of the liquid crystal layer 140 are aligned substantially parallel with the first and second substrates 110 and 130, so that the circularly polarized light passing through the liquid crystal layer 140 is converted to linearly polarized light. The linearly polarized light is converted to circularly polarized light by the second λ/4 phase difference plate 340, and transmitted through the second polarizer 330. The display panel 100 thus displays white.

FIGS. 3A to 3G are graphs illustrating luminance distribution of display panel 100 when black images are displayed as functions of the refractive indices of the first and second λ/4 phase difference plates of FIG. 1 in thickness directions.

Figure 3A:
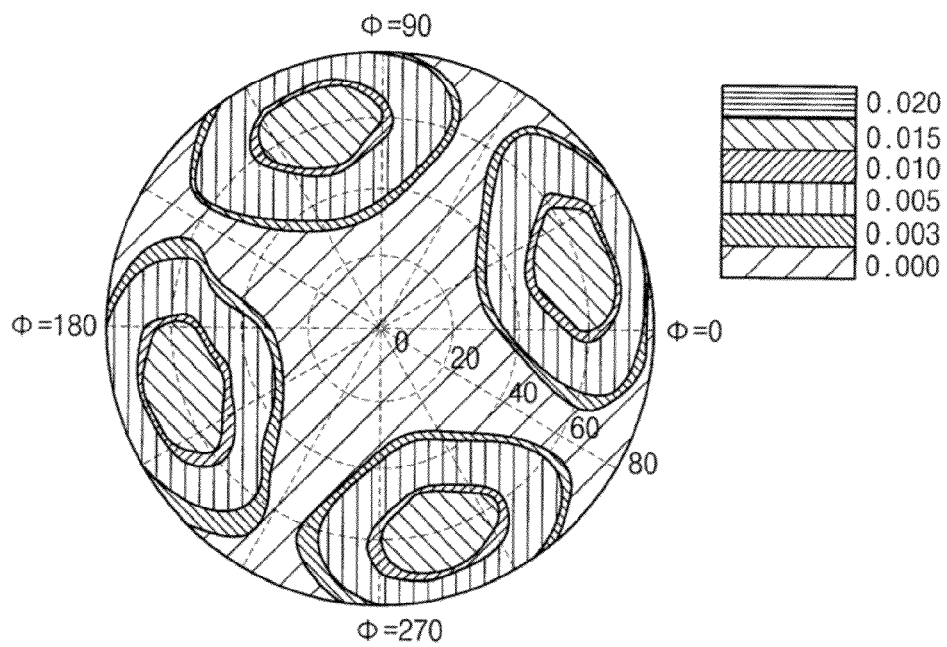
FIGS. 3A to 3G are graphs illustrating a luminance distribution with respect to the refractive index of first and second λ/4 phase difference plates of FIG. 1 in thickness directions.
Figure 3B:
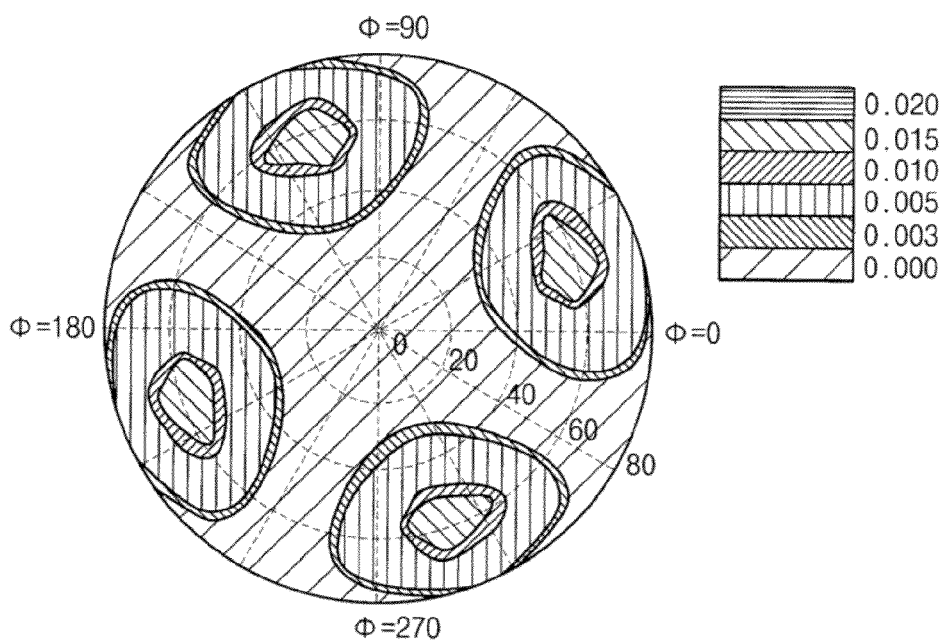

FIG. 3A illustrates the luminance distribution when the phase delay value Δnd of the liquid crystal layer 140 is about 325 nm at a wavelength of about 550 nm, and the refractive index nz of the first and second λ/4 phase difference plates 230 and 340 is about 1.35 in thickness directions. FIG. 3B illustrates the luminance distribution when the phase delay value Δnd of the liquid crystal layer 140 is about 325 nm at a wavelength of about 550 nm, and the refractive index nz of the first and second λ/4 phase difference plates 230 and 340 is about 1.45 in thickness directions.

Referring to FIGS. 3A and 3B, when a polar angle θ is between about 0 and about 20 degrees, the luminance was very low (for example, about 0.000 cd/m²) for every azimuth angle φ. This indicates that there is no light leakage when black images are displayed. The azimuth angle φ is a rotating angle with respect to a specific axis when light transmits to an incident surface, and the polar angle θ is an angle of inclination with respect to a normal of the incident face. The luminance increases as the polar angle θ increases. In particular, the luminance is about 0.015 cd/m² to about 0.020 cd/m² in four different orientations: when 1) the polar angle θ is about 60 degrees and the azimuth angle φ is between about 0 and about 30 degrees, 2) the polar angle θ is about 60 degrees and the azimuth angle φ is between about 90 and about 120 degrees, 3) the polar angle θ is about 60 degrees and the azimuth angle φ is between about 180 and about 210 degrees, and 4) the polar angle θ is about 60 degrees and the azimuth angle φ is between about 270 and about 300 degrees. The luminance value for these four orientations indicates that light leakage occurs at these orientations. From FIGS. 3A and 3B, it can also be seen that reducing the refractive index nz of the first and second λ/4 phase difference plates 230 and 340 from about 1.45 to about 1.35 reduces light leakage.

Figure 3C:
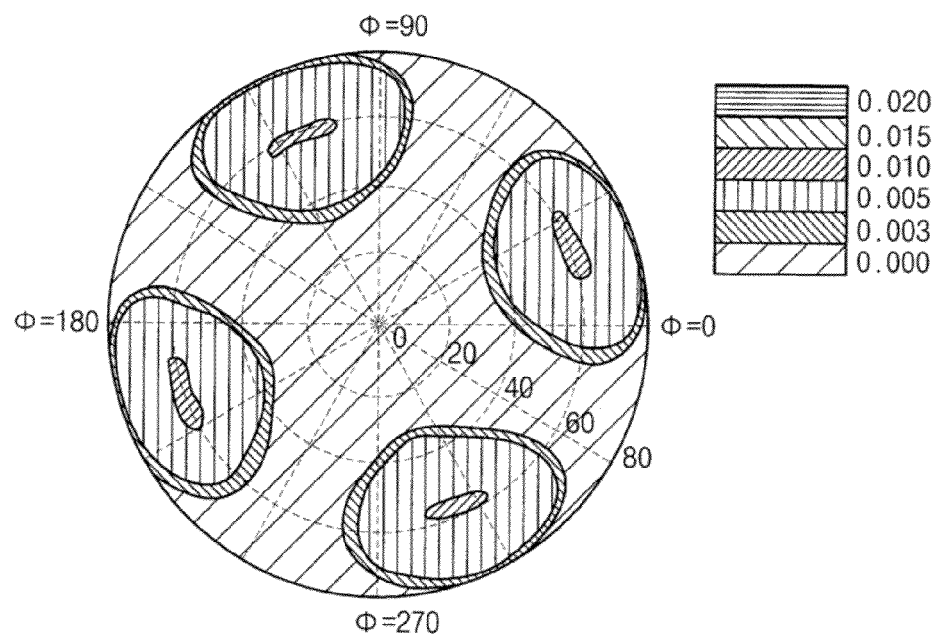
Figure 3D:
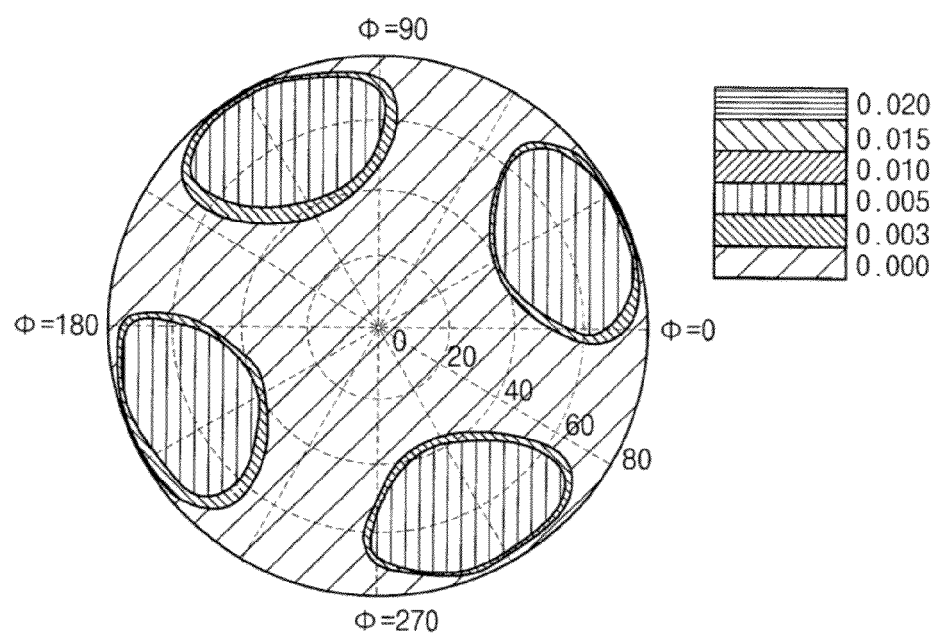
Figure 3E:
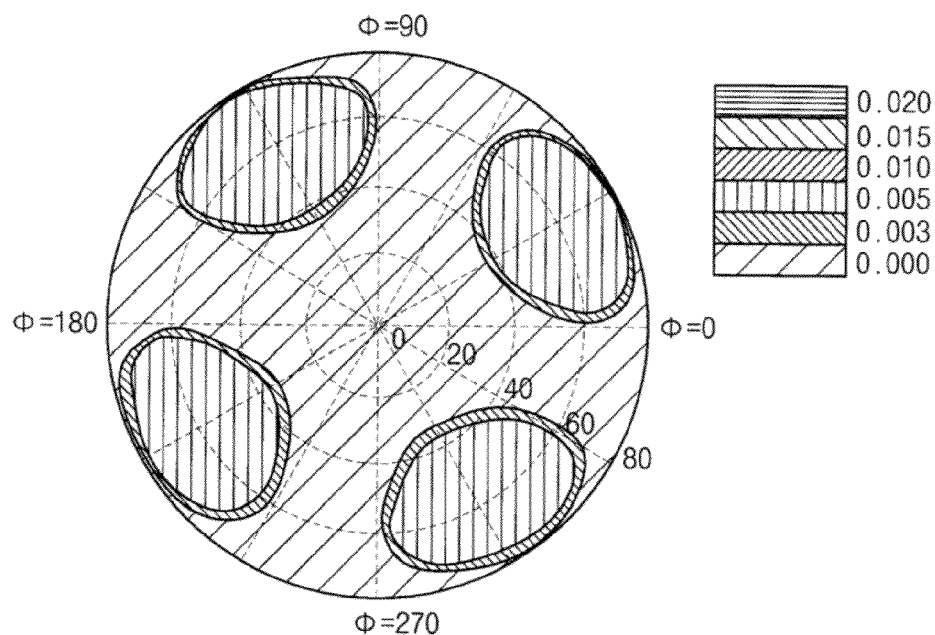
Figure 3F:
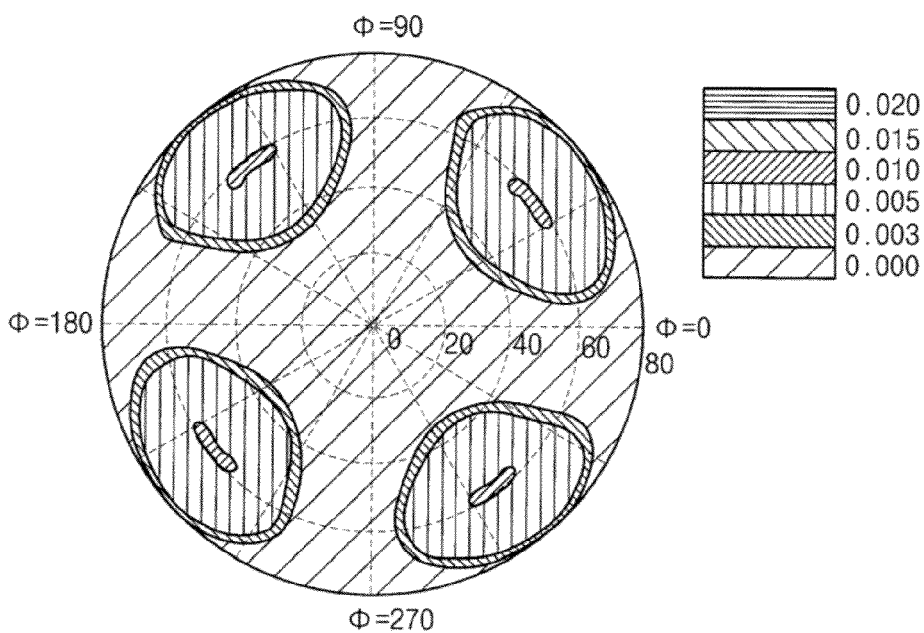

FIG. 3C illustrates the luminance distribution when the phase delay value Δnd of the liquid crystal layer 140 is about 325 nm at a wavelength of about 550 nm, and the refractive index nz of the first and second λ/4 phase difference plates 230 and 340 is about 1.55 in thickness directions. FIG. 3D illustrates the luminance distribution when the phase delay value Δnd of the liquid crystal layer 140 is about 325 nm at a wavelength of about 550 nm, and the refractive index nz of the first and second λ/4 phase difference plates 230 and 340 is about 1.65 in thickness directions. FIG. 3E illustrates the luminance distribution when the phase delay value Δnd of the liquid crystal layer 140 is about 325 nm at a wavelength of about 550 nm, and the refractive index nz of the first and second λ/4 phase difference plates 230 and 340 is about 1.75 in thickness directions. FIG. 3F illustrates the luminance distribution when the phase delay value Δnd of the liquid crystal layer 140 is about 325 nm at a wavelength of about 550 nm, and the refractive index nz of the first and second λ/4 phase difference plates 230 and 340 is about 1.85 in thickness directions.

Referring to FIGS. 3C to 3F, when the refractive index nz of the first and second λ/4 phase difference plates 230 and 340 is between about 1.55 and about 1.85 in thickness directions, the "overall" luminance was generally reduced (for example, no more than about 0.010 cd/m²) relative to that of FIGS. 3A and 3B. That is, light leakage is reduced.

Figure 3G:
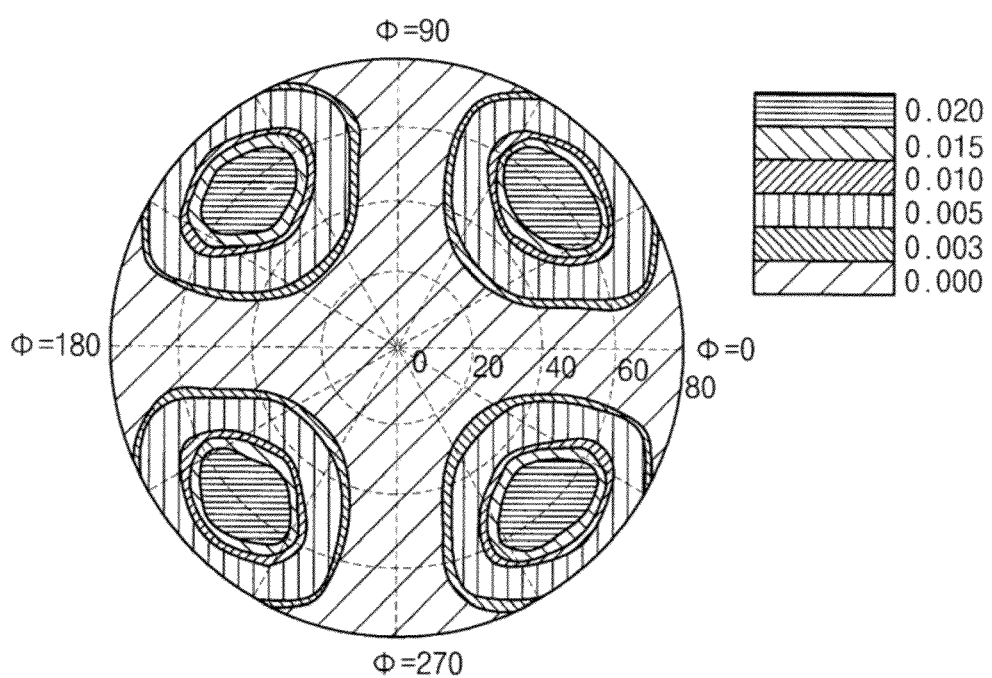

FIG. 3G illustrates the luminance distribution when the phase delay value Δnd of the liquid crystal layer 140 is about 325 nm at a wavelength of about 550 nm, and the refractive index nz of the first and second λ/4 phase difference plates 230 and 340 is about 2.05 in thickness directions. Referring to FIG. 3G, the luminance increases as the polar angle θ increases. In particular, the luminance increases to values of about 0.015 cd/m² to about 0.020 cd/m² in four cases, or orientations: when 1) the polar angle θ is about 60 degrees and the azimuth angle φ is between about 30 and about 60 degrees, 2) the polar angle θ is about 60 degrees and the azimuth angle φ is between about 120 and about 150 degrees, 3) the polar angle θ is about 60 degrees and the azimuth angle φ is between about 210 and about 240 degrees, and 4) the polar angle θ is about 60 degrees and the azimuth angle φ is between about 300 and about 330 degrees. Accordingly, light leakage occurs at these four orientations.

As shown in the above FIGS. 3A-3G, the "overall" luminance distributions are lowest for refractive indices nz between 1.65 and 1.75 (i.e., FIGS. 3D-3E). That is, for the above-described configuration, light leakage is minimized when the first and second λ/4 phase difference plates 230 and 340 have refractive indices nz between 1.65 and 1.75. However, these results are specific to a phase delay value Δnd of the liquid crystal layer 140 being about 325 nm at a wavelength of about 550 nm. The results may be different for different conditions.

Figure 4:
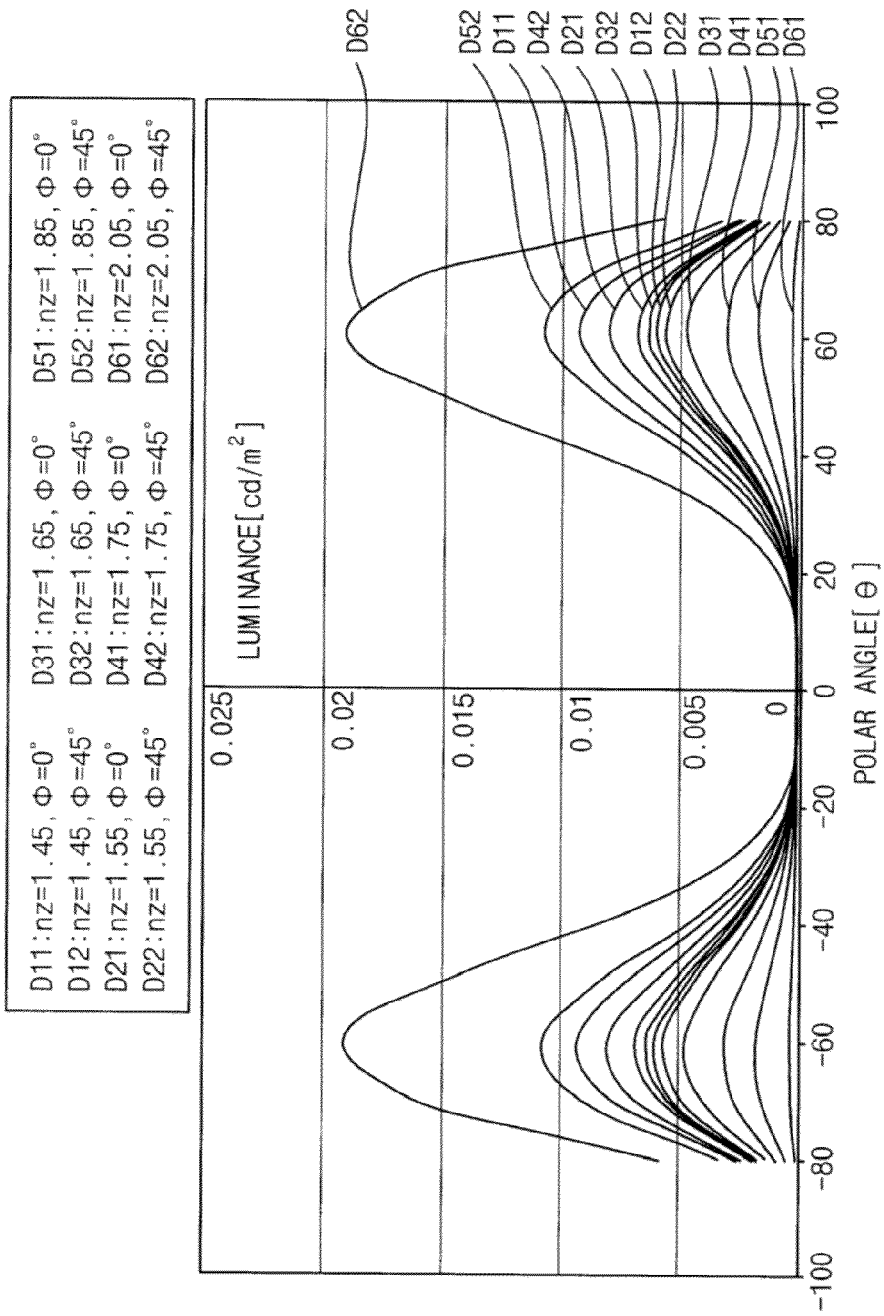
FIG. 4 is a graph illustrating a viewing angle with respect to the refractive index of first and second λ/4 phase difference plates of FIG. 1 in thickness directions.

FIG. 4 is a graph illustrating a viewing angle with respect to refractive index of the first and second λ/4 phase difference plates of FIG. 1 in thickness directions.

In FIG. 4, an X axis represents a polar angle and a Y axis represents luminance.

A luminance curve D11 is measured when the refractive index nz of the first and second λ/4 phase difference plates 230 and 340 is about 1.45 in thickness directions, and the azimuth angle φ is about 0 degrees. A luminance curve D12 is measured when the refractive index nz of the first and second λ/4 phase difference plates 230 and 340 is about 1.45 in thickness directions, and the azimuth angle φ is about 45 degrees. A luminance curve D21 is measured when the refractive index nz of the first and second λ/4 phase difference plates 230 and 340 is about 1.55 in thickness directions, and the azimuth angle φ is about 0 degrees. A luminance curve D22 is measured when the refractive index nz of the first and second λ/4 phase difference plates 230 and 340 is about 1.55 in thickness directions, and the azimuth angle φ is about 45 degrees. A luminance curve D31 is measured when the refractive index nz of the first and second λ/4 phase difference plates 230 and 340 is about 1.65 in thickness directions, and the azimuth angle φ is about 0 degrees. A luminance curve D32 is measured when the refractive index nz of the first and second λ/4 phase difference plates 230 and 340 is about 1.65 in thickness directions, and the azimuth angle φ is about 45 degrees. A luminance curve D41 is measured when the refractive index nz of the first and second λ/4 phase difference plates 230 and 340 is about 1.75 in thickness directions, and the azimuth angle φ is about 0 degrees. A luminance curve D42 is measured when the refractive index nz of the first and second λ/4 phase difference plates 230 and 340 is about 1.75 in thickness directions, and the azimuth angle φ is about 45 degrees. A luminance curve D51 is measured when the refractive index nz of the first and second λ/4 phase difference plates 230 and 340 is about 1.85 in thickness directions, and the azimuth angle φ is about 0 degrees. A luminance curve D52 is measured when the refractive index nz of the first and second λ/4 phase difference plates 230 and 340 is about 1.85 in thickness directions, and the azimuth angle φ is about 45 degrees. A luminance curve D61 is measured when the refractive index nz of the first and second λ/4 phase difference plates 230 and 340 is about 2.05 in thickness directions, and the azimuth angle φ is about 0 degrees. A luminance curve D62 is measured when the refractive index nz of the first and second λ/4 phase difference plates 230 and 340 is about 2.05 in thickness directions, and the azimuth angle φ is about 45 degree.

As shown in the above curves, when the refractive index nz of the first and second λ/4 phase difference plates 230 and 340 is about 1.65 in thickness directions, the luminance remains relatively low for any value of polar angle θ. For example, as shown in the luminance curve D31, the luminance reaches a maximum of about 0.004 cd/m$^2$ when the azimuth angle φ is about 0 degrees and the polar angle θ is about 60 degrees. Similarly, with respect to curve D32, the luminance reaches a maximum of about 0.007 cd/m$^2$ when the azimuth angle φ is about 45 degrees and the polar angle θ is about 60 degrees. There is substantially no light leakage in both frontal and extreme side views of the display panel 100 (i.e., when θ is almost zero or almost 90 degrees).

One can also see that, when refractive index nz is less than or equal to about 1.65, azimuth angle φ does not have a strong effect on luminance. However, when refractive index nz exceeds 1.65, luminance begins to vary with φ to a much greater extent. For example, with reference to curves D61 and D62 (i.e., for nz=2.05), luminance reaches a maximum of only about 0.001 cd/m$^2$ when the azimuth angle φ is about 0 degrees, but reaches a maximum of about 0.018 cd/m$^2$ when the azimuth angle φ is about 45 degrees. These results also show that light leakage occurs predominantly at intermediate viewing angles of the display panel 100, with maximum light leakage occurring at a viewing angle of approximately 60 degrees.

As shown above, when the refractive index nz of the first and second λ/4 phase difference plates 230 and 340 is between about 1.55 and about 1.75 in thickness directions, the overall luminance is relatively low, and does not vary much from front view to side view. That is, when the phase delay value Δnd of the liquid crystal layer 140 is about 325 nm at a wavelength of about 550 nm, and the refractive index nz of the first and second λ/4 phase difference plates 230 and 340 is between about 1.55 and about 1.75 in thickness directions, light leakage is kept to a relative minimum. However, these results are specific to a phase delay value Δnd of the liquid crystal layer 140 that is about 325 nm at a wavelength of about 550 nm. Results may differ for other phase delay values.

Figure 5A:
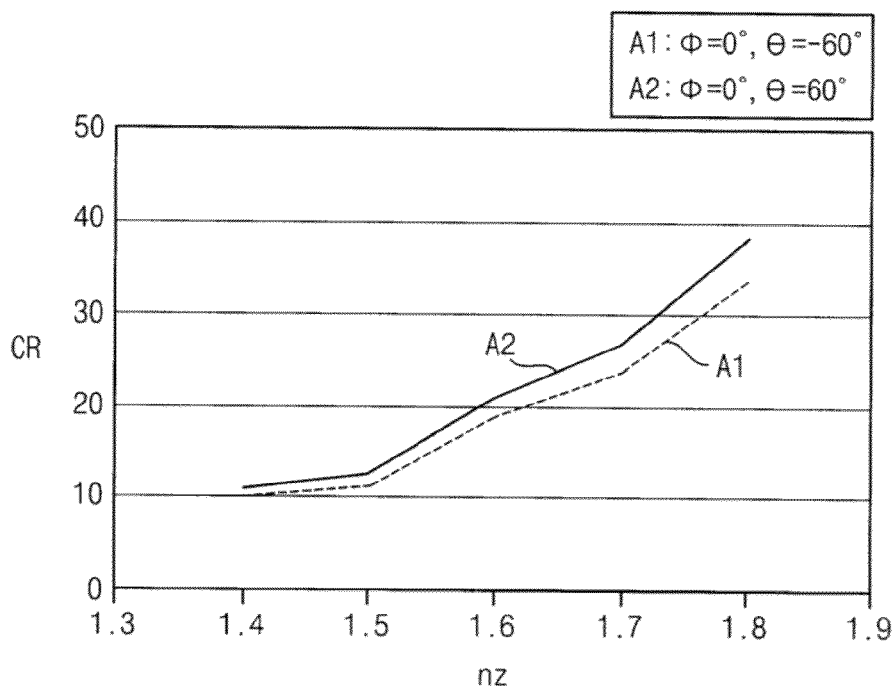
FIGS. 5A and 5B are graphs illustrating a contrast ratio (CR) with respect to a refractive index of first and second λ/4 phase difference plates of FIG. 1 in thickness directions.
Figure 5B:
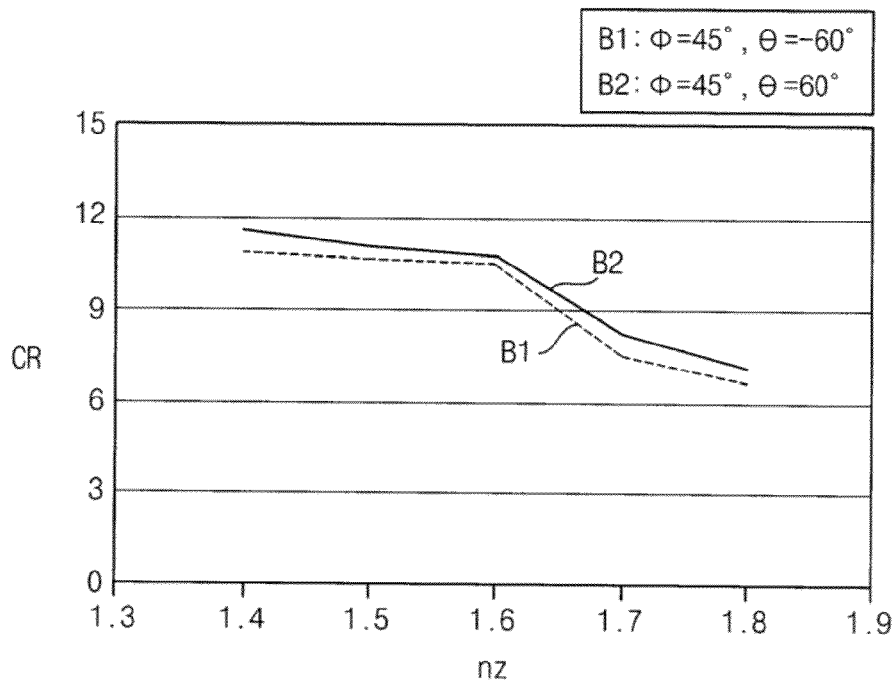

FIGS. 5A and 5B are graphs illustrating a contrast ratio (CR) with respect to the refractive index nz of the first and second λ/4 phase difference plates of FIG. 1 in thickness directions.

FIG. 5A is a graph illustrating a CR with respect to the refractive index of the first and second λ/4 phase difference plates, at a horizontal viewing angle. The phase delay value Δnd of the liquid crystal layer 140 is about 325 nm.

For example, curve A1 represents the CR measured when the azimuth angle φ is about 0 degrees and the polar angle θ is about −60 degrees. When the refractive index nz of the first and the second λ/4 phase difference plates 230 and 340 is about 1.4 in thickness directions, the CR is about 9.9.

When the refractive index nz is about 1.5 in a thickness direction, the CR is about 11.4. When the refractive index nz of the first and the second λ/4 phase difference plates 230 and 340 is about 1., the CR is about 18.9, and when the refractive index nz is about 1.7, the CR is about 24.0. When the refractive index nz is about 1.8, the CR is about 33.9.

The curve A2 represents the CR measured when the azimuth angle φ is about 0 degrees and the polar angle θ is about 60 degrees. When the refractive index nz of the first and the second λ/4 phase difference plates 230 and 340 is about 1.4 in thickness direction, the CR is about 11.9. When the refractive index nz is about 1.5, the CR is about 12.7. When the refractive index nz is about 1.6, the CR is about 21.9, and when the refractive index nz is about 1.7, the CR is about 27.0. When the refractive index nz is about 1.8 in a thickness direction, the CR is about 38.0.

FIG. 5B is a graph illustrating a CR with respect to a refractive index nz of first and second λ/4 phase difference plates in thickness directions, at a diagonal viewing angle.

For example, curve B1 represents the CR measured when the azimuth angle φ is about 45 degrees and the polar angle θ is about −60 degrees. When the refractive index nz of the first and the second λ/4 phase difference plates 230 and 340 is about 1.4 in thickness directions, the CR is about 11.0. When the refractive index nz of the first and the second λ/4 phase difference plates 230 and 340 is about 1.5, the CR is about 10.8. When the refractive index nz is about 1.6, the CR is about 10.6; when the refractive index nz is about 1.7, the CR is about 7.8, and when the refractive index nz is about 1.8 in, the CR is about 6.6.

The curve B2 represents the CR measured when the azimuth angle φ is about 45 degrees and the polar angle θ is about 60 degrees. When the refractive index nz of the first and the second λ/4 phase difference plates 230 and 340 is about 1.4 in thickness directions, the CR is about 11.6; when the refractive index nz is about 1.5, the CR is about 11.1. When the refractive index nz is about 1.6, the CR is about 10.8; when the refractive index nz is about 1.7, the CR is about 8.2; and when the refractive index nz is about 1.8, the CR is about 7.0.

As shown in the above curves, at a horizontal viewing angle, the CR increases as the refractive index nz of the first and the second λ/4 phase difference plates 230 and 340 increases. However, at a diagonal viewing angle, the CR decreases as the refractive index nz increases.

As mentioned above, the CR at a horizontal viewing angle behaves in roughly opposite manner to the CR at a diagonal viewing angle. Choosing a value of refractive index nz thus involves a trade-off between image quality at different viewing angles. For example, if the horizontal viewing angle is deemed more important, the CR is most preferable when the refractive index nz is about 1.8. However, if the diagonal viewing angle is deemed more important, the CR is most preferable when the refractive index nz is about 1.65.

According to the present example embodiment, the low-reflective film 310 is disposed over the second polarizer 330, and the second λ/4 phase difference plate 340 is disposed between the second polarizer 330 and the second substrate 130, so that glare from reflection of external light a may be prevented. In addition, the first and second λ/4 phase difference plates 230 and 340 are disposed, respectively, under and over the display panel 100, and refractive indexes of the first and second λ/4 phase difference plates 230 and 340 are adjusted so that light leakage at a side view may be reduced. This serves to improve the viewing angle of the display apparatus.

Figure 6:
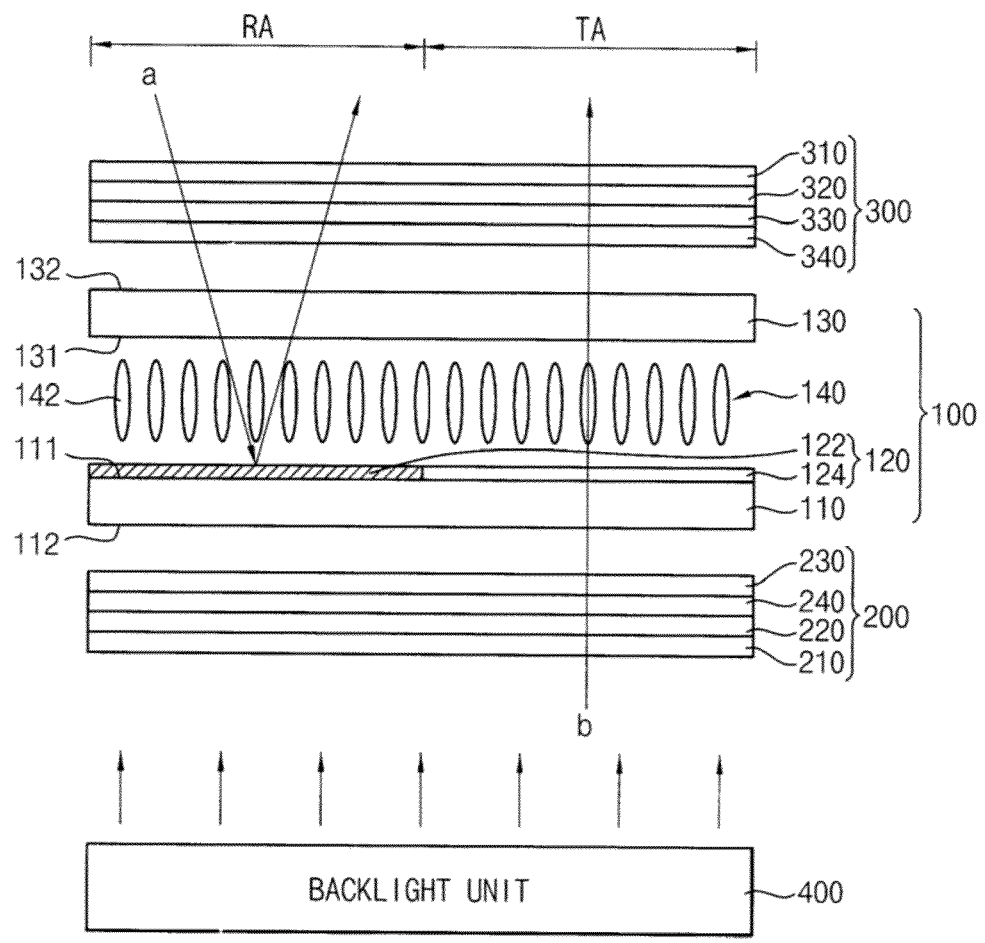
FIG. 6 is a cross sectional view illustrating a display apparatus according to another example embodiment of the present invention.
Figure 7:
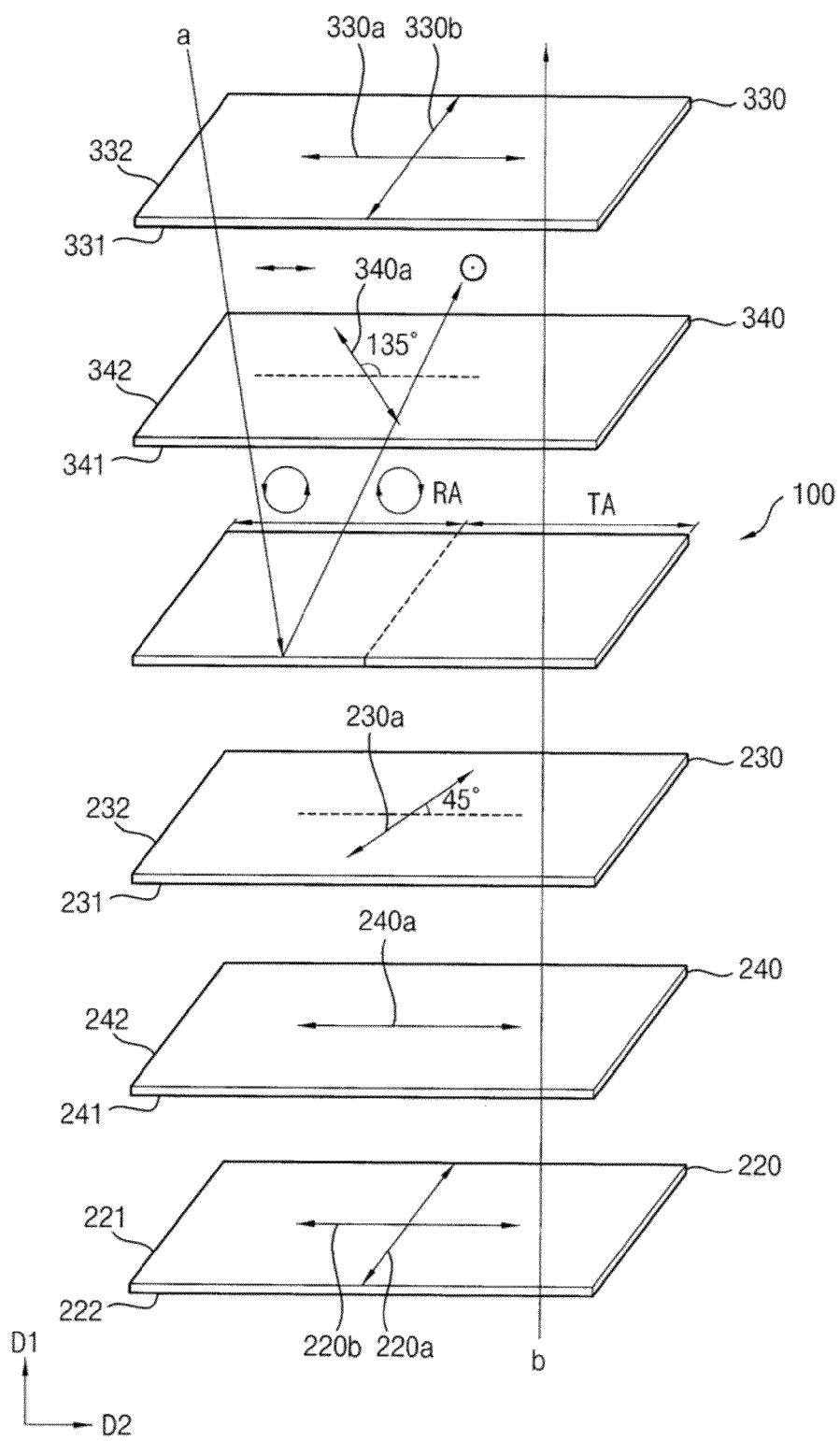
FIG. 7 is a conceptual diagram illustrating an optical operation of the display apparatus of FIG. 6.

FIG. 6 is a cross sectional view illustrating a display apparatus according to another example embodiment of the present invention. FIG. 7 is a conceptual diagram illustrating an optical operation of the display apparatus of FIG. 6.

The display apparatus of this embodiment is in many respects the same as the previous example embodiment of FIG. 1, except that a first polarizing plate 200 further includes a positive A-plate 240 as a compensating film. Thus, any repetitive explanation concerning the same or like elements as those described in the previous example embodiment of FIG. 1 is omitted.

Referring to FIGS. 6 and 7, the first polarizing plate 200 includes a first protective layer 210, a first polarizer 220, a first λ/4 phase difference plate 230, and positive A-plate 240. The second polarizing plate 300 includes a low-reflective film 310, a second protective layer 320, a second polarizer 330 and a second λ/4 phase difference plate 340.

The first polarizer 220 is disposed between the first protection layer 210 and the positive A-plate 240. The first polarizer 220 has a first absorptive axis 220a substantially parallel with a first direction D1 and a first polarizing axis 220b substantially parallel with a second direction D2. Here, direction D2 is substantially perpendicular to direction D1. The first polarizer 220 includes a first surface 221, and a second surface 222 that is opposite to the first surface 221.

The positive A-plate 240 is disposed over the first surface 221 of the first polarizer 220. The positive A-plate 240 includes a compensating axis 240a substantially parallel with the first polarizing axis 220b. The positive A-plate 240 includes a first surface 241 facing the first surface 221 of the first polarizer 220, and a second surface 242 opposite to the first surface 241 of the positive A-plate 240.

A phase delay value Rth of the positive A-plate 240 may be from about 70 nm to about 140 nm in a thickness direction. The phase delay value Rth of the positive A-plate in a thickness direction 240 is {(nx+ny)/2−nz}*d. The nx is a refractive index in an x direction, the ny is a refractive index in a y direction that is substantially perpendicular to the x direction, and the nz is a refractive index in a z direction substantially perpendicular to both x and y directions. Here, d represents a thickness of the positive A-plate 240.

Figure 8:
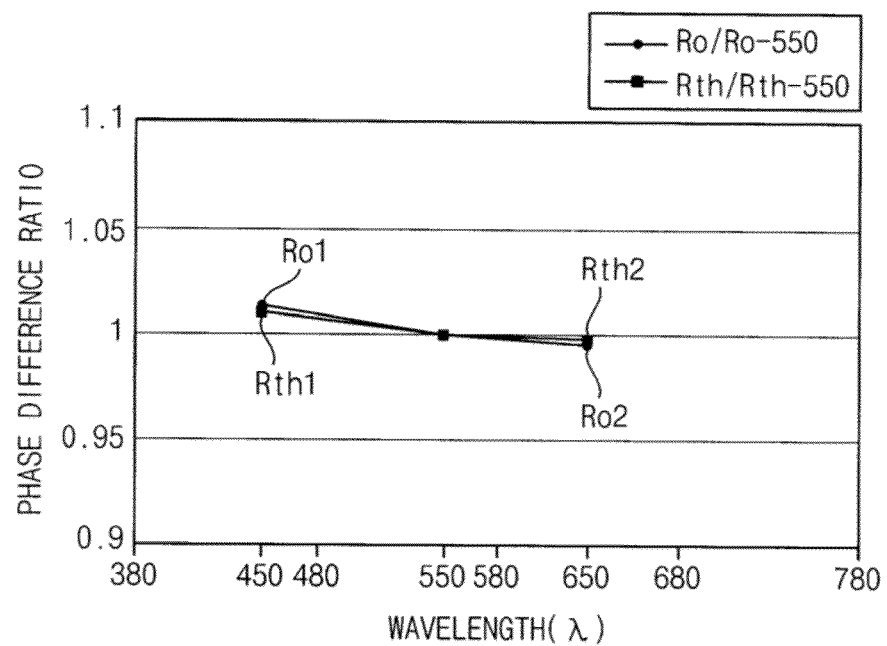
FIG. 8 is a graph illustrating a configuration of a positive A-plate of FIG. 7.

FIG. 8 is a graph illustrating a configuration of a positive A-plate of FIG. 7.

Referring to FIG. 8, a first positive plane dispersion delay value Ro1 is defined as a ratio between a plane phase delay value Ro at a wavelength of green light and a plane phase delay value Ro at a wavelength of blue light. Here, the first positive plane dispersion delay value Ro1 is about 1.013, where the wavelength of green light is about 550 nm and the wavelength of blue light is about 450 nm.

A second positive plane dispersion delay value Ro2 is defined as a ratio between the plane phase delay value Ro at a wavelength of green light and a plane phase delay value Ro at a wavelength of red light. Here, the second positive plane dispersion delay value Ro2 is about 0.996, and the wavelength of red light is about 650 nm.

A first positive thickness dispersion delay value Rth1 is defined as a ratio between a phase delay value Rth at a wavelength of green light and a phase delay value Rth at the wavelength of blue light. The first positive thickness dispersion delay value Rth1 is about 1.011 and is substantially the same as the first positive plane dispersion delay value Ro1.

A second positive thickness dispersion delay value Rth2 is defined as a ratio between the phase delay value Rth at a wavelength off green light, and a phase delay value Rth at a wavelength of red light. The second positive thickness dispersion delay value Rth2 is about 0.998, and is substantially the same as the second positive plane dispersion delay value Ro2.

Referring back to FIG. 7, the first λ/4 phase difference plate 230 is disposed over the second surface 242 of the positive A-plate 240. The first λ/4 phase difference plate 230 has a first delaying axis 230a inclined by an angle of about 45 degrees, or about 135 degrees with respect to the first polarizing axis 220b of the first polarizer 220. The first λ/4 phase difference plate 230 includes a first surface 231 facing the second surface 242 of the positive A-plate 240, and a second surface 232 opposite to the first surface 231. The second surface 232 of the first λ/4 phase difference plate 230 is coupled to second surface 112 of a first substrate 110.

A display panel 100 includes the first substrate 110, a second substrate 130, and a liquid crystal layer 140 disposed between the first substrate 110 and the second substrate 130. A phase delay value Δnd of the liquid crystal layer 140 may be from about 275 nm to about 350 nm at a wavelength of about 550 nm. For example, the phase delay value Δnd of the liquid crystal layer 140 may be about 325 nm. The Δn is anisotropic refractive index of the liquid crystal layer 140 and d is a cell gap of the liquid crystal layer 140.

The second λ/4 phase difference plate 340 is disposed over the display panel 100. In detail, the second λ/4 difference plate 340 is disposed over a second surface 132 of the second substrate 130. The second λ/4 phase difference plate 340 has a second delaying axis 340a substantially perpendicular to the first delaying axis 230a. The second delaying axis 340a is inclined by an angle of about 45 degrees, or about 135 degrees with respect to a second polarizing axis 330b of the second polarizer 330. The second λ/4 phase difference plate 340 includes a first surface 341 facing the second surface 132 of the second substrate 130, and a second surface 342 opposite to the first surface 341 of the second λ/4 phase difference plate 340. The second surface 342 of the second λ/4 phase difference plate 340 faces a first surface 331 of the second polarizer 330.

For the above-described liquid crystal layer 140 with phase delay value Δnd of about 275 nm to about 350 nm at a wavelength of about 550 nm, the first and second λ/4 phase difference plates 230 and 340 may have a refractive index nz between about 1.35 and about 2.05 in thickness directions.

The second polarizer 330 is disposed over the second surface 342 of the second λ/4 phase difference plate 340. The second polarizer 330 has a second absorptive axis 330a substantially perpendicular to the first absorptive axis 220a, and a second polarizing axis 330b substantially perpendicular to the second absorptive axis 330a. The second protective layer 320 is attached to the second surface 332 of the second polarizer 330.

FIGS. 9A to 9H are graphs illustrating a luminance distribution with respect to phase delay of a positive A-plate of FIG. 6 in a thickness direction.

Figure 9A:
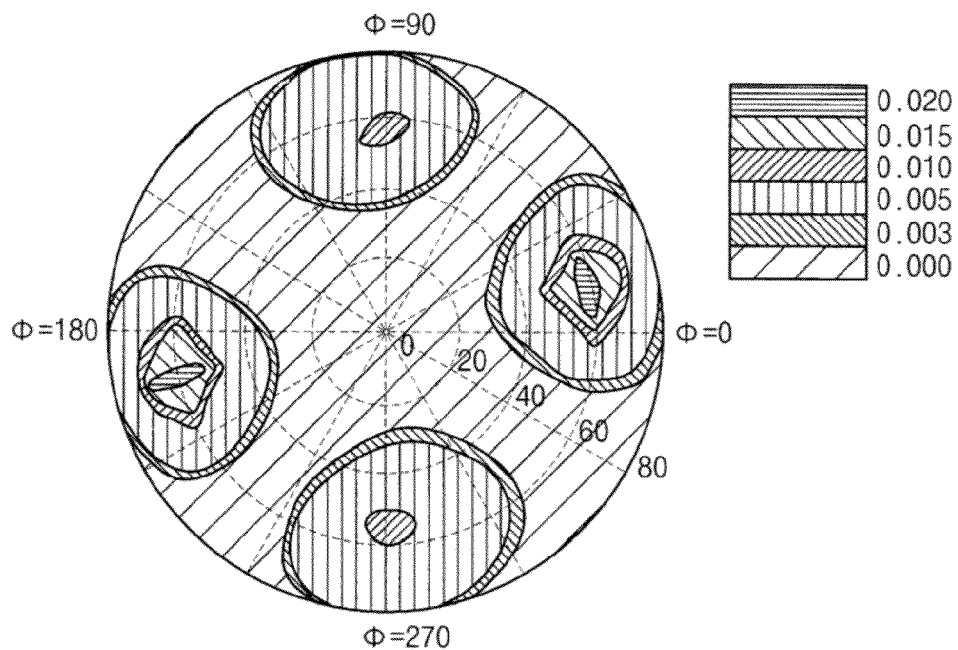
FIGS. 9A to 9H are graphs illustrating a luminance distribution with respect to phase delay of a positive A-plate of FIG. 6 in a thickness direction.

FIG. 9A illustrates a luminance distribution for black images when the phase delay value Δnd of the liquid crystal layer 140 is about 325 nm at a wavelength of about 550 nm, the refractive index nz of the first and second λ/4 phase difference plates 230 and 340 is about 1.35 in thickness directions, and the phase delay value Rth of the positive A-plate 240 is about 70 nm in a thickness direction.

In this example embodiment, "light leakage" is considered to be present only if the luminance is more than about 0.015 cd/m$^2$.

Referring to FIG. 9A, when the polar angle θ is about 60 degrees and the azimuth angle φ is between about 0 and about 30 degree, and when the polar angle θ is about 60 degrees and the azimuth angle φ is between about 180 and about 210 degrees, the luminance is about 0.015 cd/m$^2$ to about 0.020 cd/m$^2$ and light leakage is considered to occur. However, in comparison to the previous example embodiment of FIG. 3A which does not employ a compensating film, when the azimuth angle φ is between about 90 and about 120 degrees and between about 270 and about 300 degrees, light leakage is reduced.

Figure 9B:
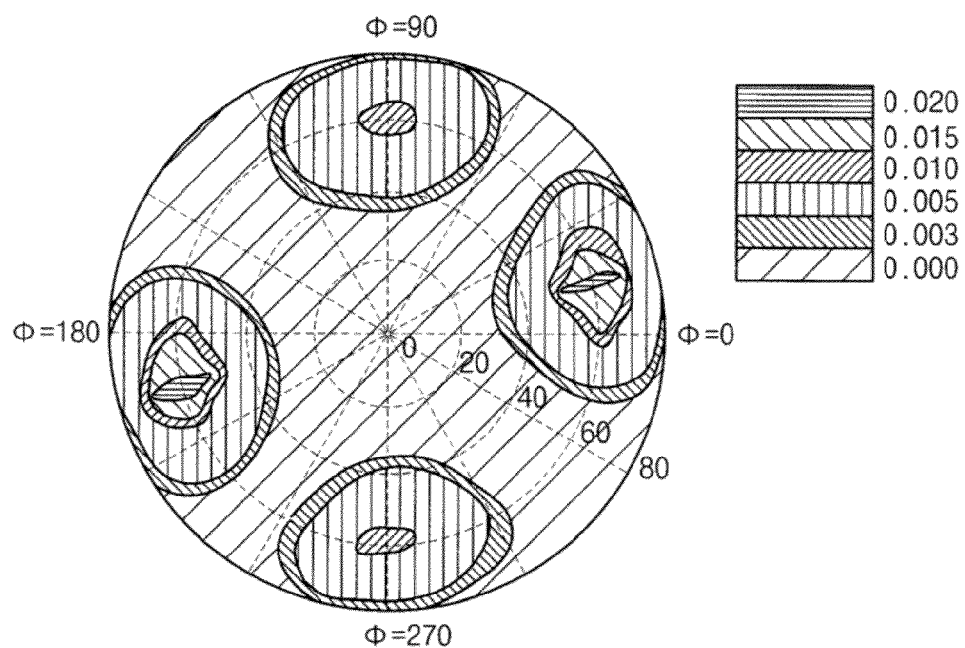
Figure 9C:
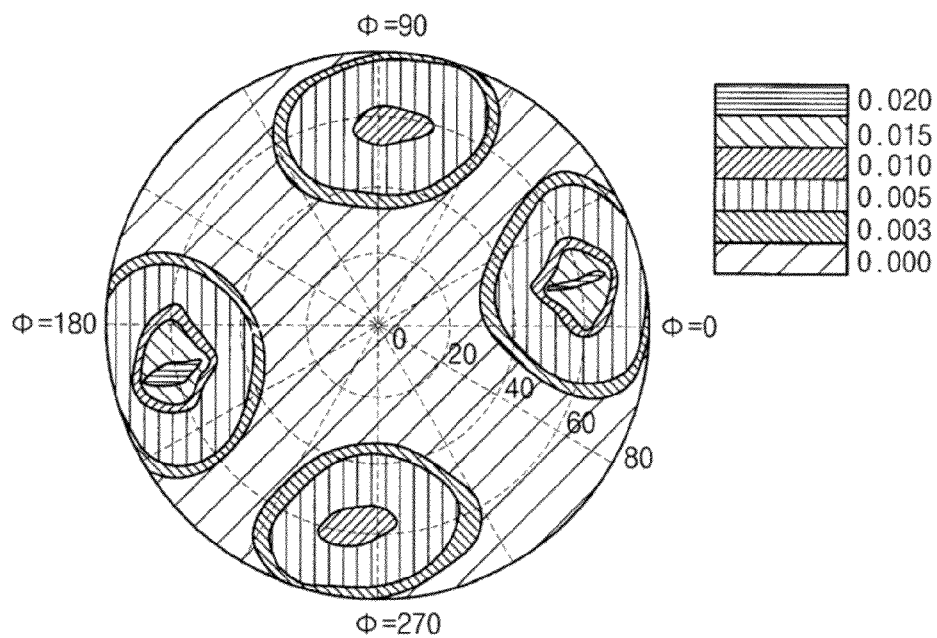
Figure 9D:
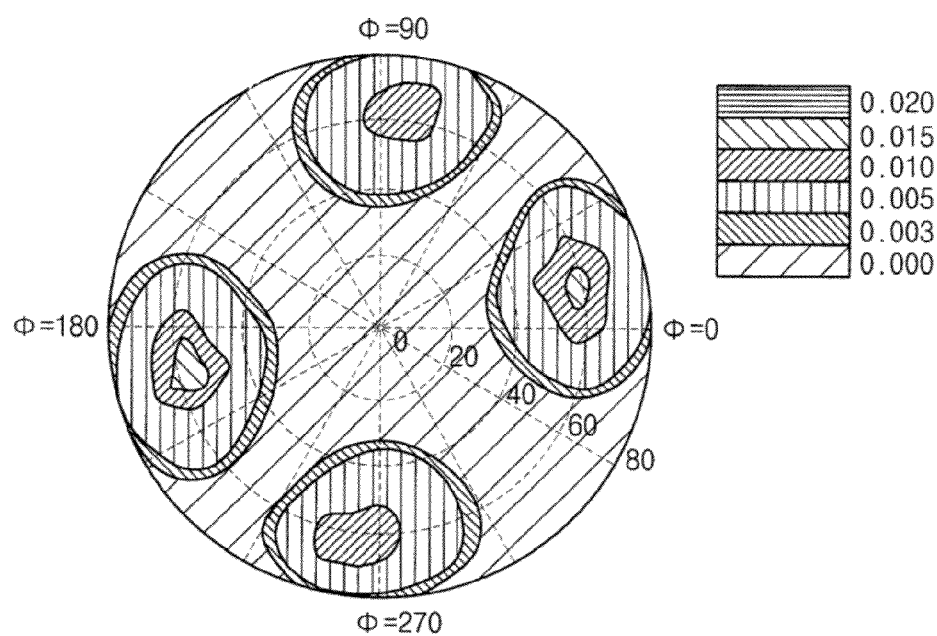

FIG. 9B illustrates a luminance distribution when the phase delay value Δnd of the liquid crystal layer 140 is about 325 nm at a wavelength of about 550 nm, the refractive index nz of the first and second λ/4 phase difference plates 230 and 340 is about 1.35 in thickness directions, and the phase delay value Rth of the positive A-plate 240 is about 80 nm in a thickness direction. FIG. 9C illustrates a luminance distribution when the phase delay value Δnd of the liquid crystal layer 140 is about 325 nm at a wavelength of about 550 nm, the refractive index nz of the first and second λ/4 phase difference plates 230 and 340 is about 1.35 in thickness directions, and the phase delay value Rth of the positive A-plate 240 is about 90 nm in a thickness direction. FIG. 9D illustrates a luminance distribution when the phase delay value Δnd of the liquid crystal layer 140 is about 325 nm at a wavelength of about 550 nm, the refractive index nz of the first and second λ/4 phase difference plates 230 and 340 is about 1.35 in thickness directions, and the phase delay value Rth of the positive A-plate 240 is about 100 nm in a thickness direction.

Referring to FIGS. 9B to 9D, comparing to the previous example embodiment of FIG. 3A, for example, when the azimuth angle φ is between about 90 and about 120 degrees and between about 270 and about 300 degrees, the light leakage is reduced considerably.

Figure 9E:
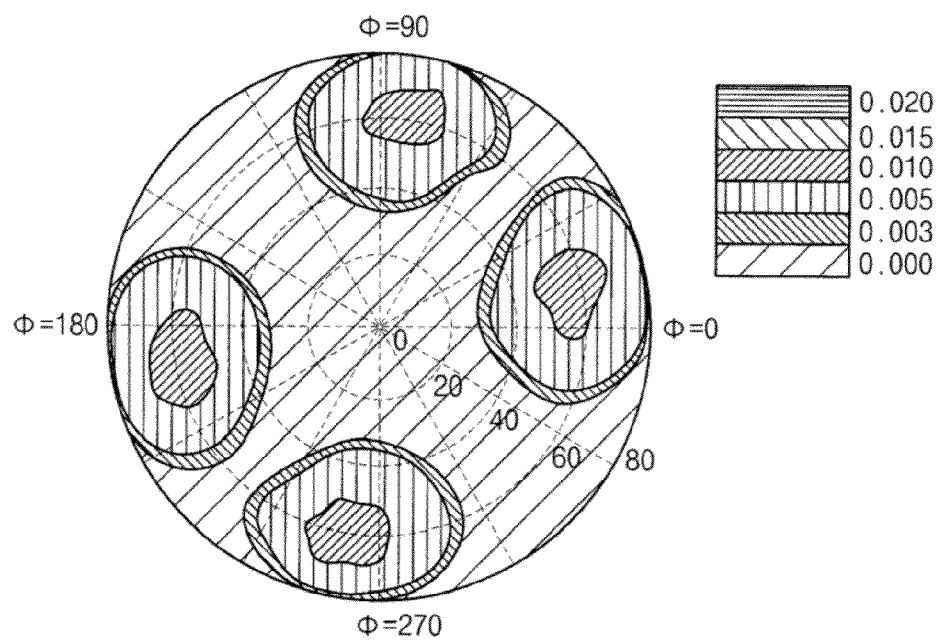
Figure 9F:
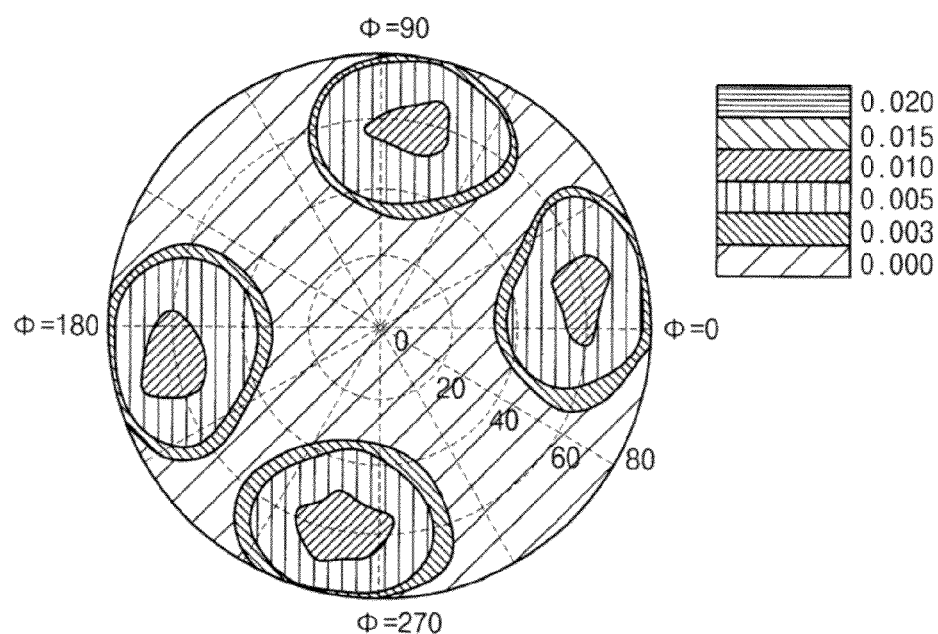

FIG. 9E illustrates a luminance distribution when the phase delay value Δnd of the liquid crystal layer 140 is about 325 nm at a wavelength of about 550 nm, the refractive index nz of the first and second λ/4 phase difference plates 230 and 340 is about 1.35 in thickness directions, and the phase delay value Rth of the positive A-plate 240 is about 110 nm in a thickness direction. FIG. 9F illustrates a luminance distribution when the phase delay value Δnd of the liquid crystal layer 140 is about 325 nm at a wavelength of about 550 nm, the refractive index nz of the first and second λ/4 phase difference plates 230 and 340 is about 1.35 in thickness directions, and the phase delay value Rth of the positive A-plate 240 is about 120 nm in a thickness direction.

Referring to FIGS. 9E and 9F, comparing to the previous example embodiment of FIG. 3A, when the phase delay value Rth of the positive A-plate 240 is about 110 nm to about 120 nm in a thickness direction, the luminance was generally less (for example, no more than about 0.010 cd/m$^2$) than that of FIG. 3A. That is, the positive A-plate 240 reduces light leakage in every direction.

Figure 9G:
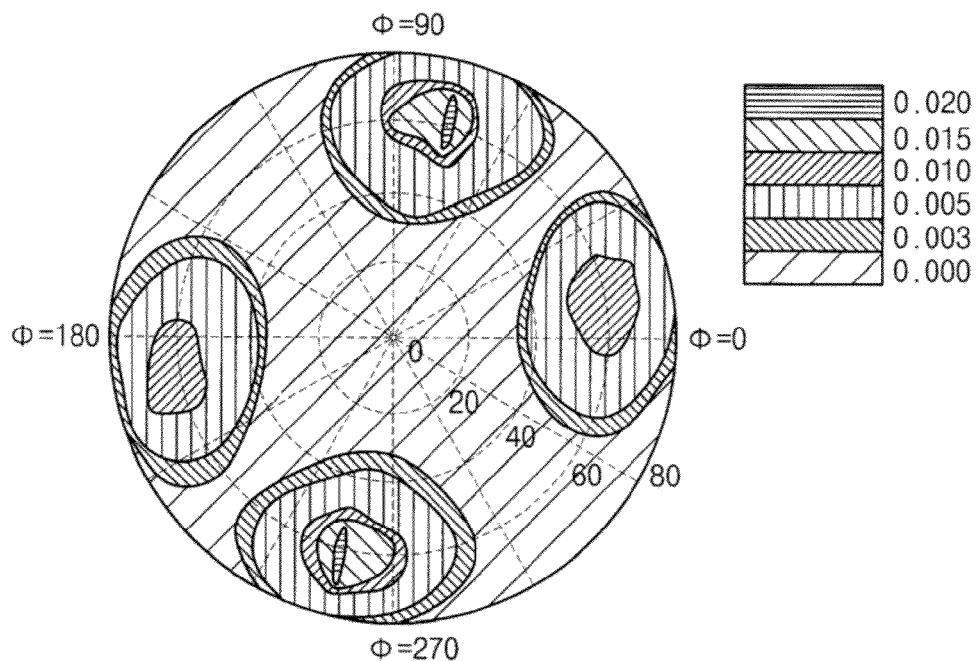
Figure 9H:
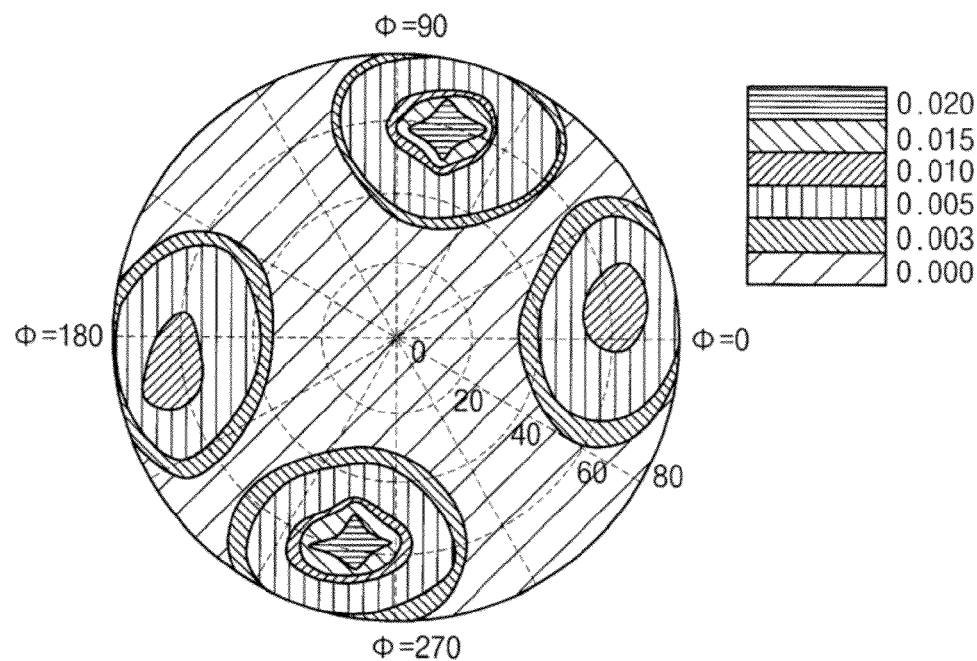

FIG. 9G illustrates a luminance distribution when the phase delay value Δnd of the liquid crystal layer 140 is about 325 nm at a wavelength of about 550 nm, the refractive index nz of the first and second λ/4 phase difference plates 230 and 340 is about 1.35 in thickness directions, and the phase delay value Rth of the positive A-plate 240 is about 130 nm in a thickness direction. FIG. 9H illustrates a luminance distribution when the phase delay value Δnd of the liquid crystal layer 140 is about 325 nm at a wavelength of about 550 nm, the refractive index nz of the first and second λ/4 phase difference plates 230 and 340 is about 1.35 in thickness directions, and the phase delay value Rth of the positive A-plate 240 is about 140 nm in a thickness direction.

Referring to FIGS. 9E and 9F, comparing to the previous example embodiment of FIG. 3A, when the phase delay value Rth of the positive A-plate 240 is about 130 nm to about 140 nm in a thickness direction, and the azimuth angle φ is between about 0 to 30 degrees and between about 180 to 210 degrees, light leakage is reduced.

As shown in the above luminance distributions, when a compensating film such as the positive A-plate 240 is employed, the light leakage of the display apparatus is reduced as compared to that without the compensating film. Particularly, when phase delay value Rth of the positive A-plate 240 is between about 110 nm and about 120 nm in a thickness direction, light leakage is maximally reduced. However, these results occur when the phase delay value Δnd of the liquid crystal layer 140 is about 325 nm at a wavelength of about 550 nm. In different conditions (e.g., for different phase delay values), results may differ.

According to the present example embodiment, positive A-plate 240 is disposed between the first polarizer 220 and the first λ/4 phase difference plate 230, so as to reduce light leakage and improve viewing angle.

Figure 10:
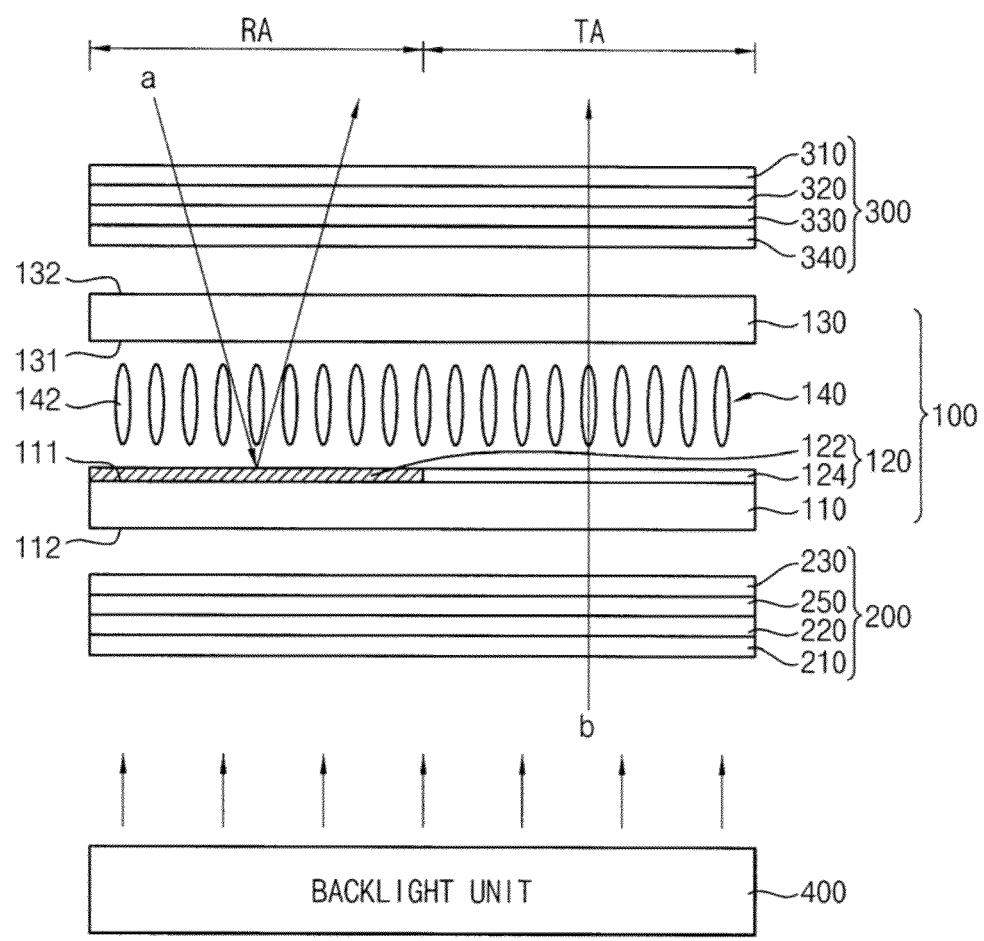
FIG. 10 is a cross sectional view illustrating a display apparatus according to still another example embodiment of the present invention.
Figure 11:
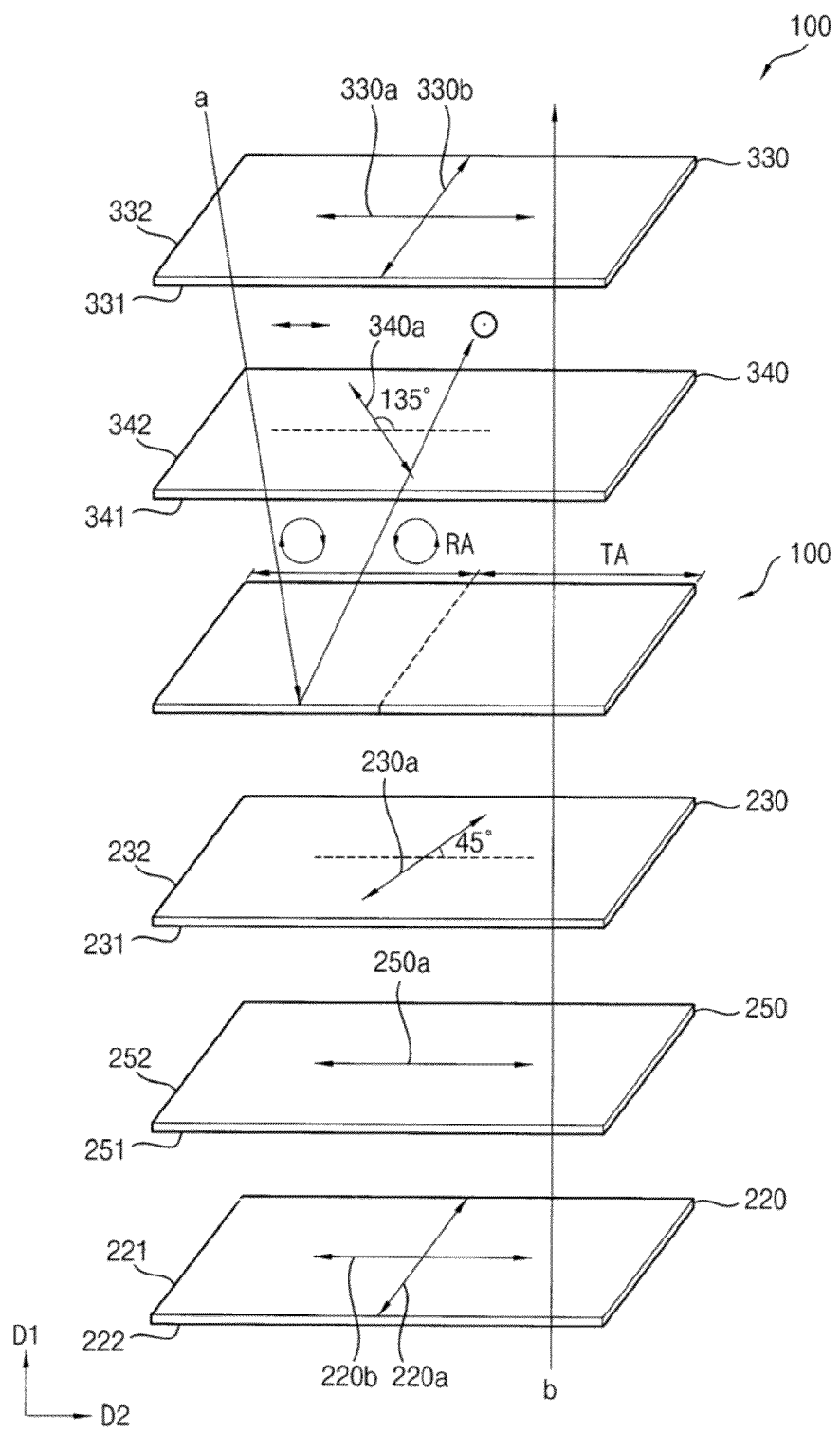
FIG. 11 is a conceptual diagram illustrating an optical operation of the display apparatus of FIG. 10.

FIG. 10 is a cross sectional view illustrating a display apparatus according to a further example embodiment of the present invention. FIG. 11 is a conceptual diagram illustrating aspects of operation of the display apparatus of FIG. 10.

The display apparatus according to the present example embodiment is substantially the same as the previous example embodiment of FIG. 1, except that a first polarizing plate 200 further includes a negative C-plate 250 as a compensating film. Thus, any repetitive explanation concerning the same or like elements as those described in the previous example embodiment of FIG. 1 is omitted.

Referring to FIGS. 10 and 11, the first polarizing plate 200 includes a first protective layer 210, a first polarizer 220, a first λ/4 phase difference plate 230 and the negative C-plate 250. The second polarizing plate 300 includes a low-reflective film 310, a second protective layer 320, a second polarizer 330 and a second λ/4 phase difference plate 340.

The first polarizer 220 is disposed between the first protection layer 210 and the negative C-plate 250. The first polarizer 220 has a first absorptive axis 220a substantially parallel with a first direction D1, and a first polarizing axis 220b substantially parallel with a second direction D2. Here, second direction D2 is substantially perpendicular to the first direction D1. The first polarizer 220 includes a first surface 221 and a second surface 222 opposite to the first surface 221.

The negative C-plate 250 is disposed over the first surface 221 of the first polarizer 220. The negative C-plate 250 includes a compensating axis 250a substantially parallel with the first polarizing axis 220b. The negative C-plate 250 includes a first surface 251 facing the first surface 221 of the first polarizer 220, and a second surface 252 opposite to the first surface 251.

The negative C-plate 250 is a phase delay film satisfying nx=ny>nz, where nx is a refractive index in an x direction, ny is a refractive index in a y direction substantially perpendicular to the x direction, and nz is a refractive index in a z direction substantially perpendicular to both the x and y directions. In the present example embodiment, the x direction is substantially perpendicular to the first direction D1, and the y direction is substantially perpendicular to the second direction D2.

The plane phase delay value Ro of the negative C-plate 250 is determined by Ro=(nx−ny)*d, where d is the thickness of C-plate 250. Accordingly, as nx=ny, the value of Ro for negative C-plate 250 is about zero.

The phase delay value Rth of the negative C-plate 250 is {(nx+ny)/2−nz}*d in a thickness direction. As nx=ny>nz for the thickness direction of C-plate 250, the phase delay value Rth is positive. The phase delay value Rth of the negative C-plate 250 may preferably be between about 30 nm and about 80 nm in a thickness direction.

The first λ/4 phase difference plate 230 is disposed over the second surface 252 of the negative C-plate 250. The first λ/4 phase difference plate 230 has a first delaying axis 230a inclined by an angle of about 45 degrees, or about 135 degrees with respect to the first polarizing axis 220b of the first polarizer 220. The first λ/4 phase difference plate 230 includes a first surface 231 facing the second surface 252 of the negative C-plate 250, and a second surface 232 opposite to the first surface 231. The second surface 232 of the first λ/4 phase difference plate 230 is coupled to a second surface 112 of a first substrate 110.

A display panel 100 includes a first substrate 110, a second substrate 130 and a liquid crystal layer 140 disposed between the first substrate 110 and the second substrate 130. A phase delay value Δnd of the liquid crystal layer 140 may be from about 275 nm to about 350 nm at a wavelength of about 550 nm. For example, the phase delay value Δnd of the liquid crystal layer 140 may be about 325 nm. The Δn is an anisotropic refractive index of the liquid crystal layer 140 and d is a cell gap of the liquid crystal layer 140.

The second λ/4 phase difference plate 340 is disposed over the display panel 100. In detail, the second λ/4 phase difference plate 340 is disposed over a second surface 132 of the second substrate 130. The second λ/4 phase difference plate 340 has a second delaying axis 340a substantially perpendicular to the first delaying axis 230a. The second λ/4 phase difference plate 340 includes a first surface 341 facing the second surface 132 of the second substrate 130, and a second surface 342 facing a first surface 331 of the second polarizer 330.

For the above-described liquid crystal layer 140 with phase delay value Δnd of about 275 nm to about 350 nm, the first and second λ/4 phase difference plates 230 and 340 may have a refractive index nz between about 1.35 and about 2.05 in thickness directions.

The second polarizer 330 is disposed over the second surface 342 of the second λ/4 phase difference plate 340. The second polarizer 330 has a second absorptive axis 330a substantially perpendicular to the first absorptive axis 220a, and a second polarizing axis 330b substantially perpendicular to the second absorptive axis 330a. The second protective layer 320 is attached to the second surface 332 of the second polarizer 330.

Figure 12A:
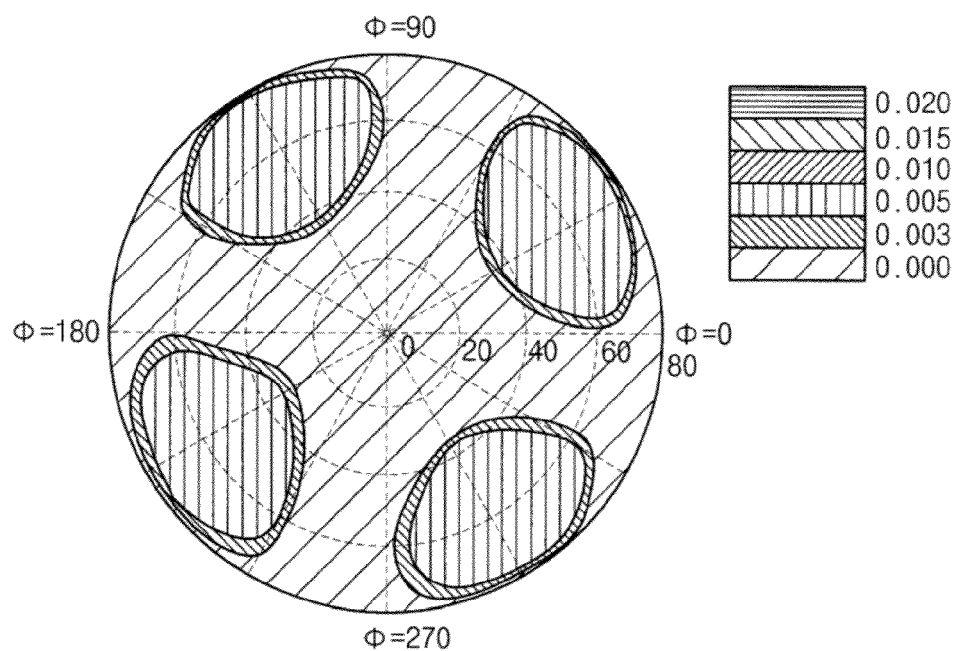
FIGS. 12A to 12C are graphs illustrating a luminance distribution with respect to phase delay of a negative C-plate of FIG. 10 in a thickness direction.
Figure 12B:
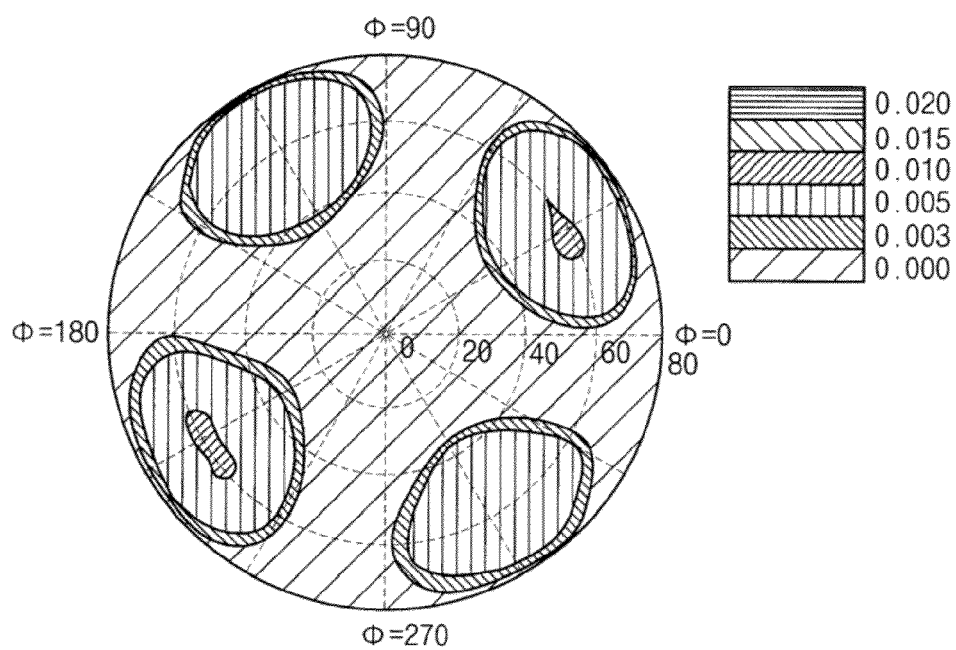
Figure 12C:
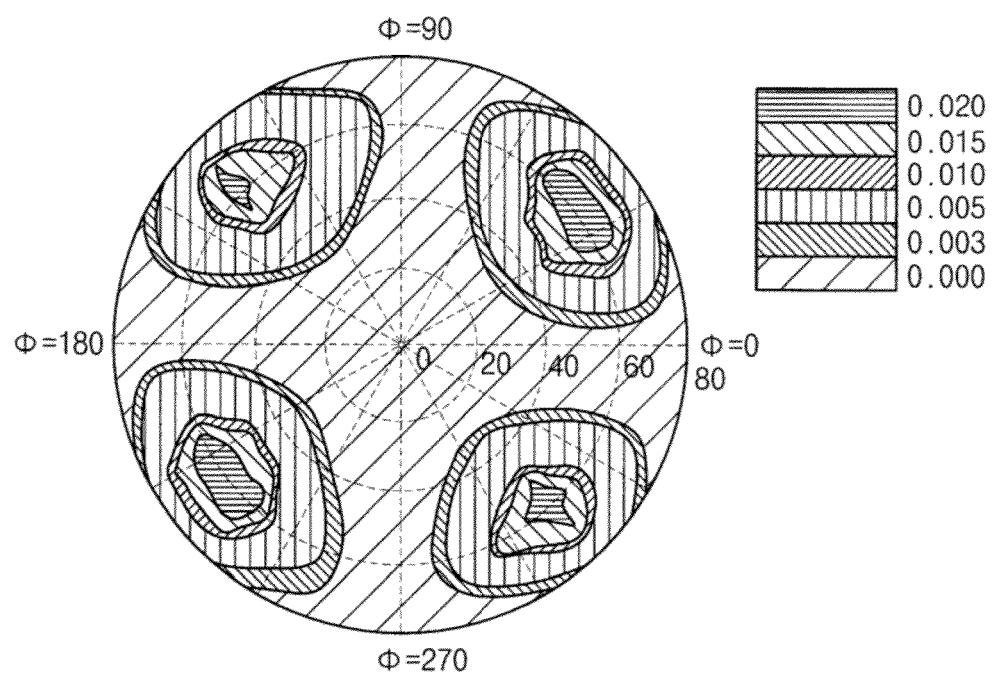

FIGS. 12A to 12C are graphs illustrating a luminance distribution with respect to phase delay for the negative C-plate 250 of FIG. 10, and for black images.

FIG. 12A illustrates a luminance distribution when the phase delay value Δnd of the liquid crystal layer 140 is about 325 nm at a wavelength of about 550 nm, the refractive index nz of the first and second λ/4 phase difference plates 230 and 340 is about 1.65 in thickness directions, and the phase delay value Rth of the negative C-plate 250 is about 10 nm in a thickness direction. FIG. 12B illustrates a luminance distribution when the phase delay value Δnd of the liquid crystal layer 140 is about 325 nm at a wavelength of about 550 nm, the refractive index nz of the first and second λ/4 phase difference plates 230 and 340 is about 1.65 in thickness directions, and the phase delay value Rth of the negative C-plate 250 is about 30 nm in a thickness direction. FIG. 12C illustrates a luminance distribution when the phase delay value Δnd of the liquid crystal layer 140 is about 325 nm at a wavelength of about 550 nm, the refractive index nz of the first and second λ/4 phase difference plates 230 and 340 is about 1.65 in thickness directions, and the phase delay value Rth of the negative C-plate 250 is about 60 nm in a thickness direction.

Referring to FIGS. 12A to 12C, when a polar angle θ is between about 0 and about 20 degrees, the luminance was very low (for example, about 0.000 cd/m$^2$) for any azimuth angle φ. The luminance generally increases as the polar angle θ and the phase delay value Rth increase.

Meanwhile, comparing to the previous example embodiment of FIG. 3D which does not employee the negative C-plate 250, when the phase delay value Rth of the negative C-plate 250 is between about 10 nm to about 30 nm in a thickness direction, the luminance distribution is similar to that of FIG. 3D. However, when the phase delay value Rth of the negative C-plate 250 is about 60 nm in a thickness direction, the areas of relatively high luminance are shifted counterclockwise relative to those of FIG. 3D. Although not shown in the figures, the shift of the areas of relatively high luminance increases as the phase delay value Rth of the negative C-plate 250 increases. Therefore, it is possible to adjust the luminance distribution to be symmetric for the entire azimuth angle φ.

According to the present example embodiment, the asymmetric viewing angle may be improved to be symmetric by adjusting the phase delay value Rth of the negative C-plate 250 in a thickness direction, thus improving display quality.

Figure 13:
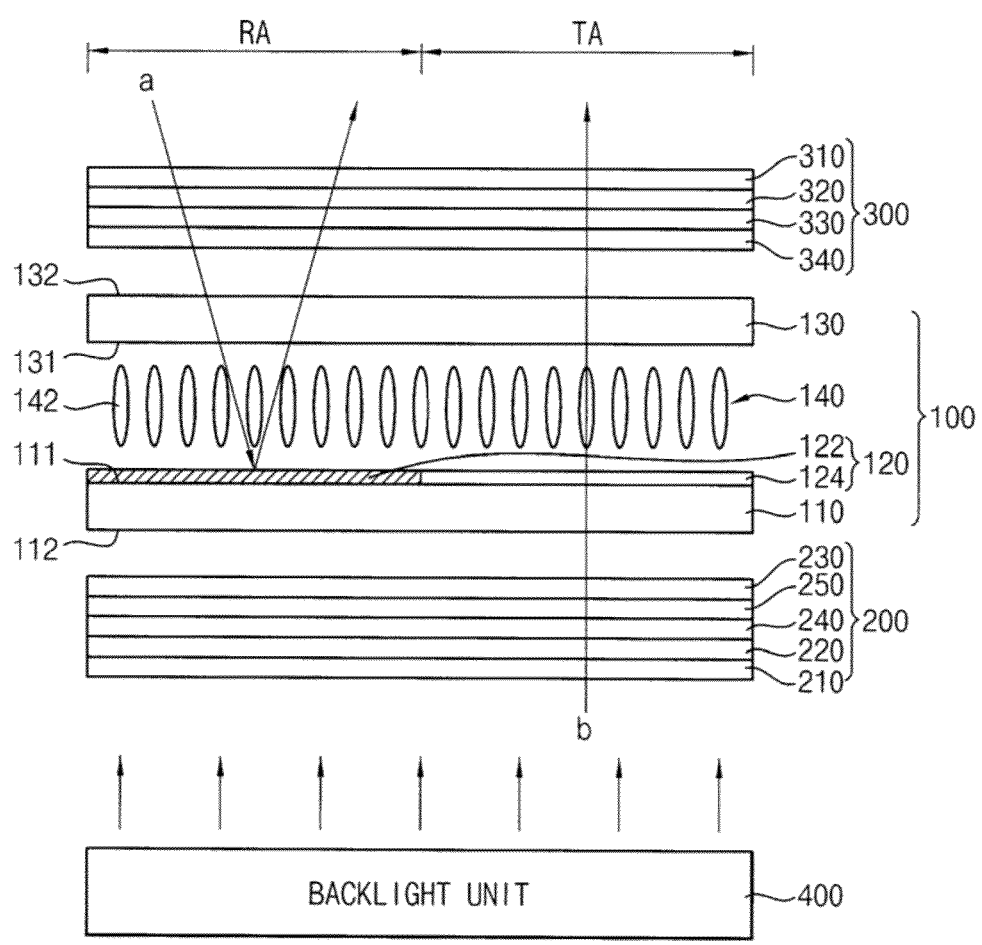
FIG. 13 is a cross sectional view illustrating a display apparatus according to still another example embodiment of the present invention.
Figure 14:
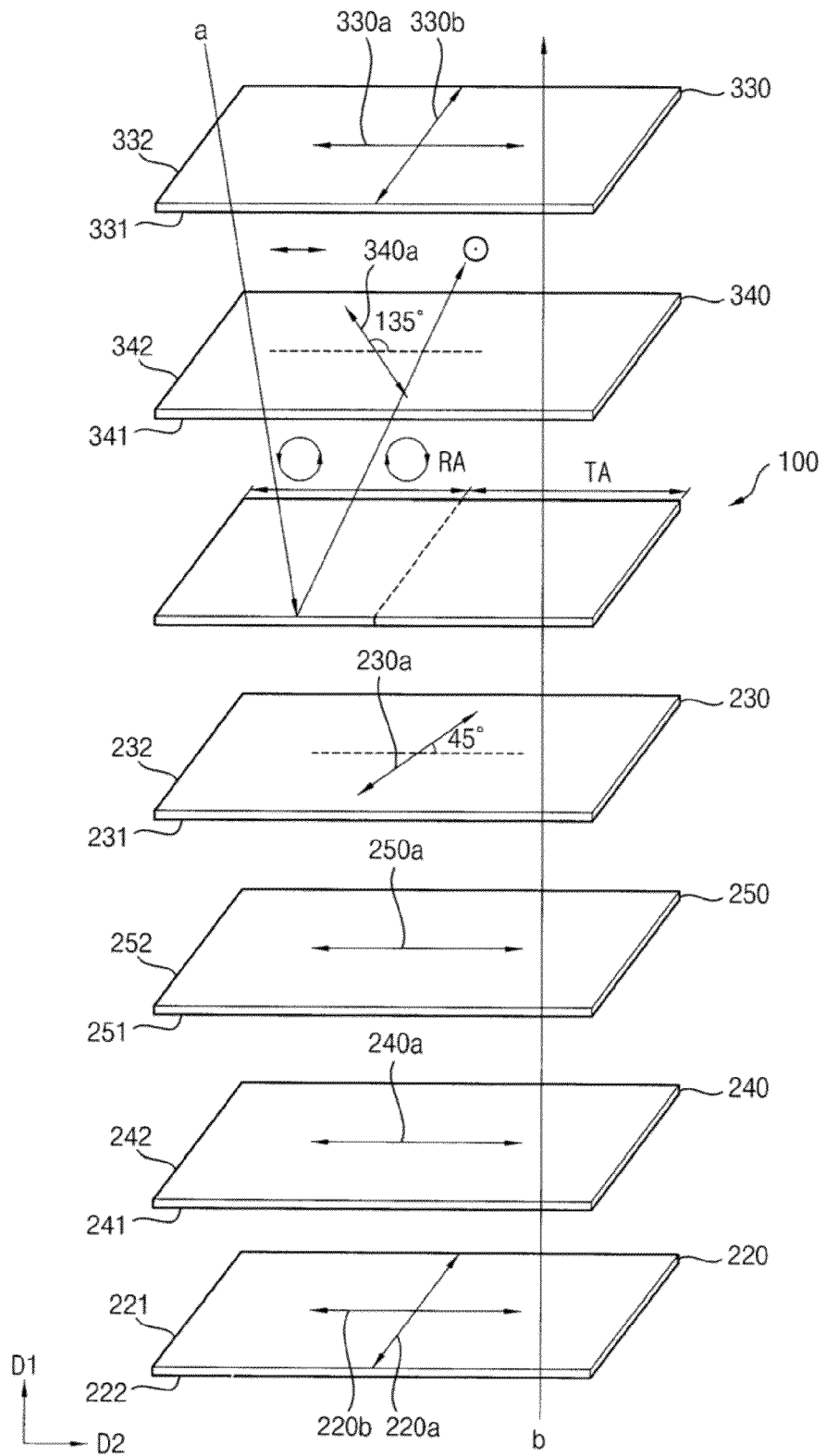
FIG. 14 is a conceptual diagram illustrating an optical operation of the display apparatus of FIG. 13.

FIG. 13 is a cross sectional view illustrating a display apparatus according to still another example embodiment of the present invention. FIG. 14 is a conceptual diagram illustrating an optical operation of the display apparatus of FIG. 13.

The display apparatus according to the present example embodiment is substantially the same as the previous example embodiment of FIG. 1, except that a first polarizing plate 200 further includes a positive A-plate 240 and a negative C-plate 250 as a compensating film. Thus, any repetitive explanation concerning the same or like elements as those described in the previous example embodiments is omitted.

Referring to FIGS. 13 and 14, the first polarizing plate 200 includes a first protective layer 210, a first polarizer 220, a first λ/4 phase difference plate 230, positive A-plate 240 and the negative C-plate 250. The second polarizing plate 300 includes a low-reflective film 310, a second protective layer 320, a second polarizer 330 and a second λ/4 phase difference plate 340.

The first polarizer 220 is disposed between the first protection layer 210 and the positive A-plate 240. The first polarizer 220 has a first absorptive axis 220a substantially parallel with a first direction D1, and a first polarizing axis 220b substantially parallel with a second direction D2. Here, second direction D2 is substantially perpendicular to first direction D1. The first polarizer 220 includes a first surface 221 and a second surface 222 opposite to the first surface 221.

The positive A-plate 240 is disposed over the first surface 221 of the first polarizer 220. The positive A-plate 240 includes a compensating axis 240a substantially parallel with the first polarizing axis 220b. A phase delay value Rth of the positive A-plate 240 may be between about 70 nm and about 140 nm in a thickness direction. The positive A-plate 240 includes a first surface 241 facing the first surface 221 of the first polarizer 220, and a second surface 242 opposite to the first surface 241.

The negative C-plate 250 is disposed over the second surface 242 of the positive A-plate 240. The negative C-plate 250 includes a compensating axis 250a substantially parallel with the first polarizing axis 220b. A phase delay value Rth of the negative C-plate 250 may be between about 30 nm and about 80 nm in a thickness direction. The negative C-plate 250 includes a first surface 251 facing the second surface 242 of the positive A-plate 240, and a second surface 252 opposite to the first surface 251.

The first λ/4 phase difference plate 230 is disposed over the second surface 252 of the negative C-plate 250. The first λ/4 phase difference plate 230 has a first delaying axis 230a inclined by an angle of about 45 degrees, or about 135 degrees with respect to the first polarizing axis 220b of the first polarizer 220. The first λ/4 phase difference plate 230 includes a first surface 231 facing the second surface 252 of the negative C-plate 250, and a second surface 232 opposite to the first surface 231. The second surface 232 of the first λ/4 phase difference plate 230 is coupled to a second surface 112 of a first substrate 110.

A display panel 100 includes the first substrate 110, a second substrate 130 and a liquid crystal layer 140 disposed between the first substrate 110 and the second substrate 130. A phase delay value Δnd of the liquid crystal layer 140 may be from about 275 nm to about 350 nm at a wavelength of about 550 nm. For example, the phase delay value Δnd of the liquid crystal layer 140 may be about 325 nm. The Δn is an anisotropic refractive index of the liquid crystal layer 140 and d is a cell gap of the liquid crystal layer 140.

The second λ/4 phase difference plate 340 is disposed over the display panel 100. In detail, the second λ/4 phase difference plate 340 is disposed over a second surface 132 of the second substrate 130. The second λ/4 phase difference plate 340 has a second delaying axis 340a substantially perpendicular to the first delaying axis 230a. The second λ/4 phase difference plate 340 includes a first surface 341 facing the second surface 132 of the second substrate 130, and a second surface 342 facing a first surface 331 of the second polarizer 330.

For the above-described liquid crystal layer 140 with phase delay value Δnd of about 275 nm to about 350 nm at a wavelength of about 550 nm, the first and second λ/4 phase difference plates 230 and 340 may have a refractive index nz between about 1.35 and about 2.05 in thickness directions.

The second polarizer 330 is disposed over the second surface 342 of the second λ/4 phase difference plate 340. The second polarizer 330 has a second absorptive axis 330a substantially perpendicular to the first absorptive axis 220a, and a second polarizing axis 330b substantially perpendicular to the second absorptive axis 330a. The second protective layer 320 is attached to the first surface 331, which is opposite to the second surface 332 of the second polarizer 330.

Although the present example embodiment has a positive A-plate 240 is disposed first, with the negative C-plate 250 disposed thereafter, the structures should not be limited to the present example embodiment. For example, the negative C-plate 250 may be applied first, and the positive A-plate 240 may be applied second.

Figure 15:
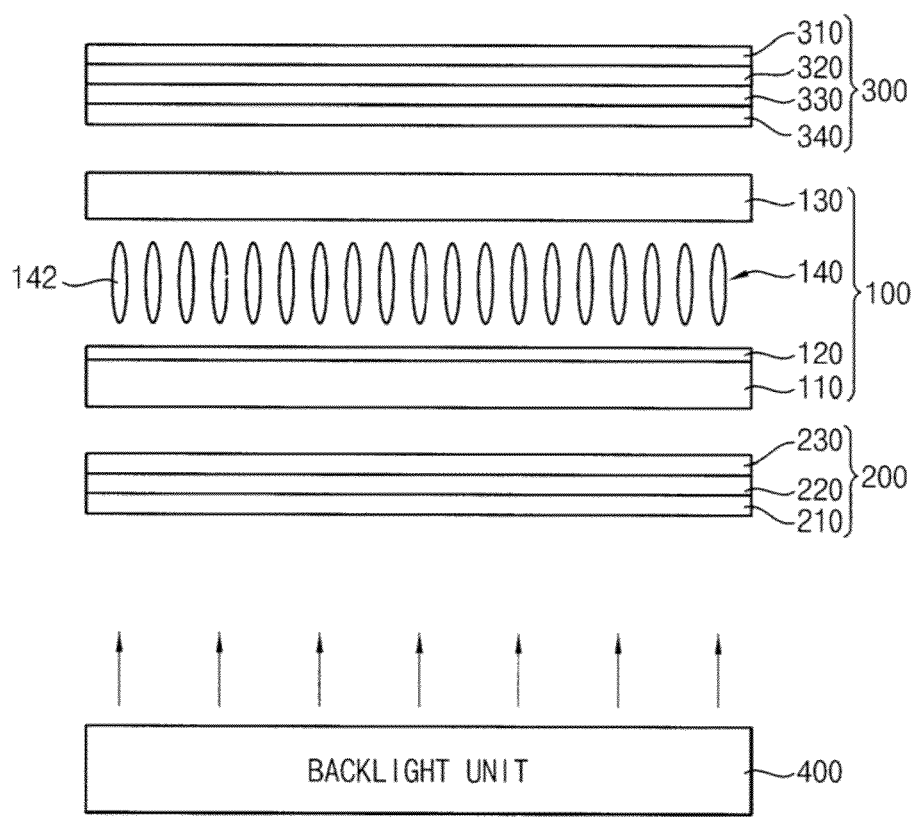
FIG. 15 is a cross sectional view illustrating a display apparatus according to still another example embodiment of the present invention.

FIG. 15 is a cross sectional view illustrating a display apparatus according to still another example embodiment of the present invention.

The display apparatus according to the present example embodiment is substantially the same as the previous example embodiment of FIGS. 1 to 5B, except that the display apparatus is a transmissive type display in which display panel 100 is operated in transmissive mode. Thus, any repetitive explanation concerning the same or like elements as those described in the previous example embodiment of FIGS. 1 to 5B is omitted.

Referring to FIG. 15, the display panel 100 includes a first substrate 110, a second substrate 130 opposite to the first substrate 110, and a liquid crystal layer 140 disposed between the first substrate 110 and the second substrate 130.

The first substrate 110 further includes a pixel electrode 120. The pixel electrode 120 includes a transparent conductive material. The second substrate 130 includes a plurality of color filters (not shown), and a common electrode (not shown) disposed on the color filters. The liquid crystal layer 140 is disposed between the first substrate 110 and the second substrate 130. The liquid crystal layer 140 may be driven in a vertical alignment (VA) mode.

The first polarizing plate 200 is attached under the display panel 100. The first polarizing plate 200 may include a first protection layer 210, a first polarizer 220 and a first λ/4 phase difference plate 230.

The first protection layer 210 is disposed under the first polarizer 220, so that the first protection layer 210 protects the first polarizer 220. The first polarizer 220 also polarizes incident light in a specific direction. The first λ/4 phase difference plate 230 is disposed between the first substrate 110 and the first polarizer 220. The first λ/4 phase difference plate 230 delays the light incident from the first polarizer 220 by a λ/4 phase. The first λ/4 phase difference plate 230 may have a refractive index nz between about 1.35 and about 2.05 in a thickness direction.

The second polarizing plate 300 is attached to the display panel 100. The second polarizing plate 300 may include a low-reflective film 310, a second protection layer 320, a second polarizer 330 and a second λ/4 phase difference plate 340. The low-reflective film 310 is disposed over the second protection layer 320. The second protection layer 320 is disposed over the second polarizer 330, so that the second protection layer 320 protects the second polarizer 330. The second polarizer 330 is disposed under the second protection layer 320 to polarize an incident light in a specific direction. The second λ/4 phase difference plate 340 is disposed between the second substrate 130 and the second polarizer 330, and delays the light incident from the second substrate 130 by a λ/4 phase. The second λ/4 phase difference plate 340 may have a refractive index nz between about 1.35 and about 2.05 in a thickness direction.

According to the present example embodiment, the low-reflective film 310 is disposed over the second polarizer 330, and the second λ/4 phase difference plate 340 is disposed between the second polarizer 330 and the second substrate 130 so that glare by the reflection of an external light a may be prevented. In addition, the refractive indexes of the first and the second λ/4 phase difference plates 230 and 340 are adjusted in thickness directions so that light leakage in a side view may be reduced. Therefore, the viewing angle of the display apparatus may be improved.

Figure 16:
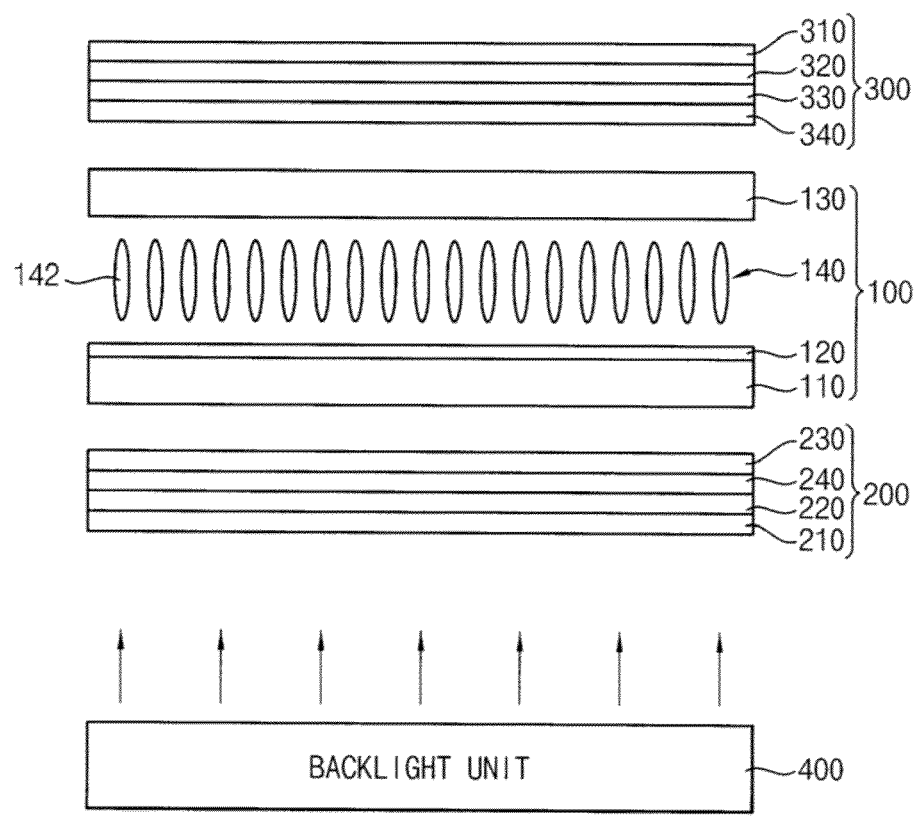
FIG. 16 is a cross sectional view illustrating a display apparatus according to still another example embodiment of the present invention.

FIG. 16 is a cross sectional view illustrating a display apparatus according to still another example embodiment of the present invention.

The display apparatus according to the present example embodiment is substantially the same as the previous example embodiment of FIGS. 6 to 9H, except that the display apparatus is a transmissive type display in which a display panel 100 is operated in transmissive mode. Thus, any repetitive explanation concerning the same or like elements as those described in the previous example embodiment of FIGS. 6 to 9H is omitted.

Referring to FIG. 16, the display apparatus of the present example embodiment includes the display panel 100, a first polarizing plate 200 attached under the display panel 100, a second polarizing plate 300 attached on the display panel 100 and a backlight unit 400 disposed under the first polarizing plate 200 to provide light to the display panel 100.

The first polarizing plate 200 includes a first protective layer 210, a first polarizer 220, a first λ/4 phase difference plate 230 and a positive A-plate 240. The second polarizing plate 300 includes a low-reflective film 310, a second protective layer 320, a second polarizer 330 and a second λ/4 phase difference plate 340.

The first polarizer 220 is disposed between the first protection layer 210 and the positive A-plate 240. The positive A-plate 240 is disposed over the first polarizer 220. The positive A-plate 240 includes a compensating axis substantially parallel with a polarizing axis of the first polarizer 220.

A phase delay value Rth of the positive A-plate 240 may be from about 70 nm to about 140 nm in a thickness direction. The phase delay value Rth of the positive A-plate 240 is {(nx+ny)/2−nz}*d in a thickness direction. The nx is a refractive index in an x direction, the ny is a refractive index in a y direction substantially perpendicular to the x direction and the nz is a refractive index in a z direction substantially perpendicular to both the x and y directions. Here, d represents a thickness of the positive A-plate 240.

The first λ/4 phase difference plate 230 is disposed over the positive A-plate 240. The first λ/4 phase difference plate 230 has a delaying axis inclined by an angle of about 45 degrees, or about 135 degrees with respect to the polarizing axis of the first polarizer 220.

The second λ/4 phase difference plate 340 is disposed over the display panel 100. The second λ/4 phase difference plate 340 has a delaying axis inclined by an angle of about 45 degrees, or about 135 degrees with respect to a polarizing axis of the second polarizer 330. The delaying axis of the second λ/4 phase difference plate 340 is substantially perpendicular to the delaying axis of the first λ/4 phase difference plate 230. For a liquid crystal layer 140 having a phase delay value Δnd from about 275 nm to about 350 nm at a wavelength of about 550 nm, the first and second λ/4 phase difference plates 230 and 340 may have a refractive index nz between about 1.35 and about 2.05 in thickness directions.

The second polarizer 330 is disposed over the second λ/4 phase difference plate 340. The second polarizer 330 has the polarizing axis substantially perpendicular to the polarizing axis of the first polarizer 220.

According to the present example embodiment, the positive A-plate 240 is disposed between the first polarizer 220 and the first λ/4 phase difference plate 230. The phase delay value Rth in the thickness direction of the positive A-plate 240 is adjusted so that the light leakage in a side view may be reduced. This acts to improve the viewing angle of the display apparatus.

Figure 17:
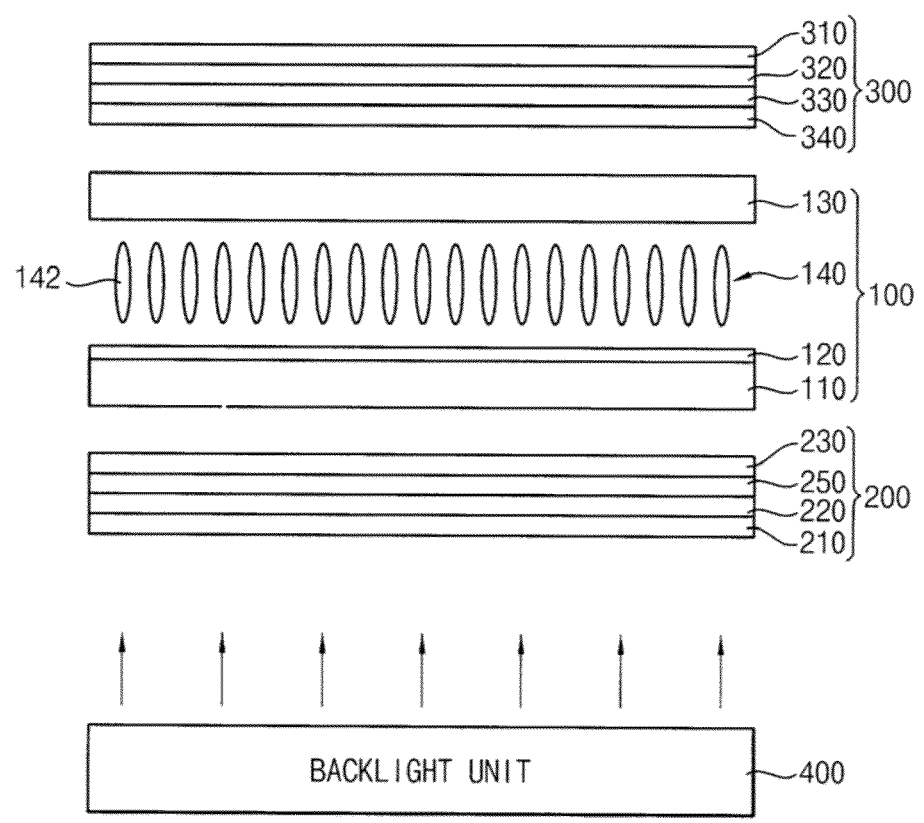
FIG. 17 is a cross sectional view illustrating a display apparatus according to still another example embodiment of the present invention.

FIG. 17 is a cross sectional view illustrating a display apparatus according to still another example embodiment of the present invention.

The display apparatus according to the present example embodiment is substantially the same as the previous example embodiment of FIGS. 10 to 12C, except that the display apparatus is a transmissive type display in which a display panel 100 is operated in transmissive mode. Thus, any repetitive explanation concerning the same or like elements as those described in the previous example embodiment of FIGS. 10 to 12C is omitted.

Referring to FIG. 17, the display apparatus of the present example embodiment includes the display panel 100, a first polarizing plate 200 attached under the display panel 100, a second polarizing plate 300 attached on the display panel 100 and a backlight unit 400 disposed under the first polarizing plate 200 providing light to the display panel 100.

The first polarizing plate 200 includes a first protective layer 210, a first polarizer 220, a first λ/4 phase difference plate 230 and a negative C-plate 250. The second polarizing plate 300 includes a low-reflective film 310, a second protective layer 320, a second polarizer 330 and a second λ/4 phase difference plate 340.

The first polarizer 220 is disposed between the first protection layer 210 and the negative C-plate 250. The negative C-plate 250 is disposed over the first polarizer 220. The negative C-plate 250 includes a compensating axis substantially parallel with a polarizing axis of the first polarizer 220.

The plane phase delay value Ro of negative C-plate 250 is (nx−ny)*d, where d represents a thickness of the negative C-plate 250. As above, nx=ny for C-plate 250, so that Ro is about zero. A phase delay value Rth of the negative C-plate 250 is positive in a thickness direction. The phase delay value Rth of the negative C-plate 250 is {(nx+ny)/2−nz}*d in a thickness direction. The phase delay value Rth of the negative C-plate 250 may preferably be between about 30 nm and about 80 nm in a thickness direction.

The first λ/4 phase difference plate 230 is disposed over the negative C-plate 250. The first λ/4 phase difference plate 230 has a delaying axis inclined by an angle of about 45 degrees, or about 135 degrees with respect to the polarizing axis of the first polarizer 220. The second λ/4 phase difference plate 340 is disposed over the display panel 100. The second λ/4 phase difference plate 340 has a delaying axis inclined by an angle of about 45 degrees, or about 135 degrees with respect to a polarizing axis of the second polarizer 330. The delaying axis of the second λ/4 phase difference plate 340 is substantially perpendicular to the delaying axis of the first λ/4 phase difference plate 230. For liquid crystal layer 140 having a phase delay value Δnd from about 275 nm to about 350 nm at a wavelength of about 550 nm, the first and second λ/4 phase difference plates 230 and 340 may have a refractive index nz between about 1.35 and about 2.05 in thickness directions.

The second polarizer 330 is disposed over the second λ/4 phase difference plate 340. The second polarizer 330 has a polarizing axis substantially perpendicular to the polarizing axis of the first polarizer 220.

According to the present example embodiment, the negative C-plate 250 is disposed between the first polarizer 220 and the first .lamda./4 phase difference plate 230, and the phase delay value Rth of the negative C-plate 250 is adjusted so that the viewing angle may be made diagonally symmetric. This acts to improve display quality.

Figure 18:
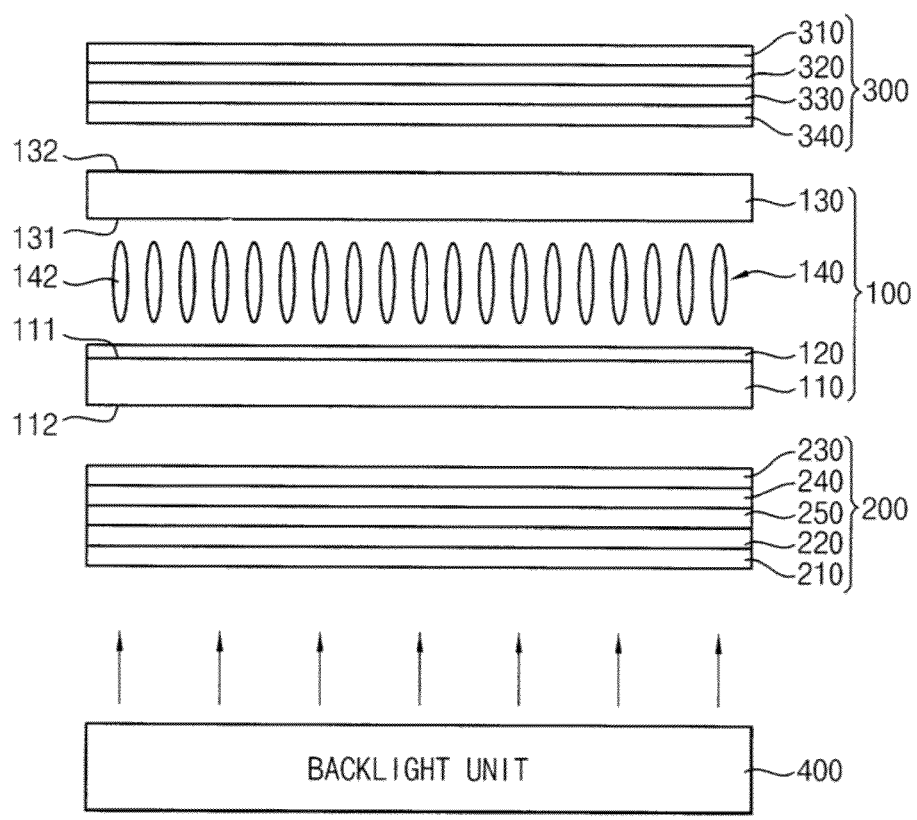
FIG. 18 is a cross sectional view illustrating a display apparatus according to still another example embodiment of the present invention.
Figure 19:
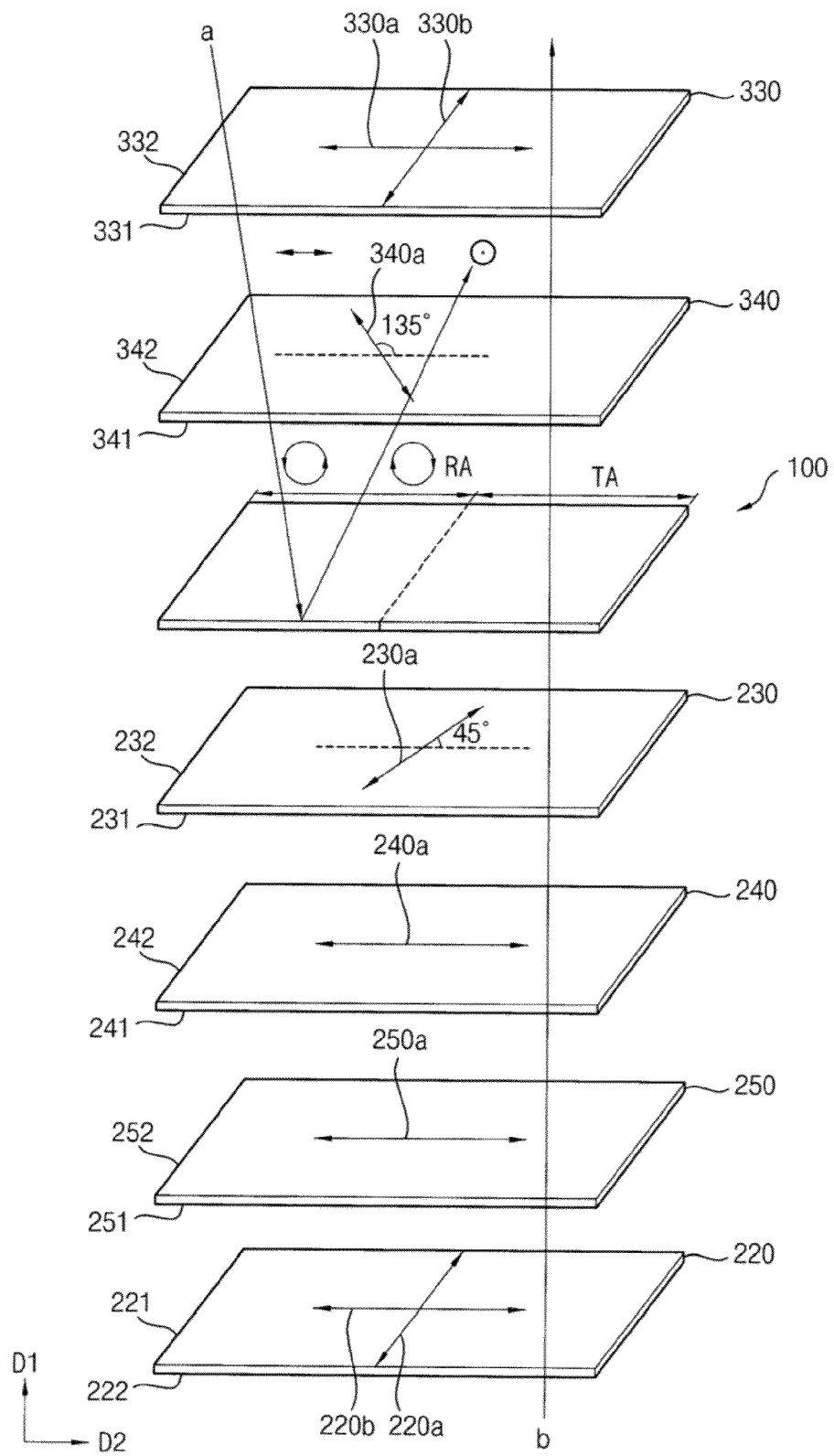
FIG. 19 is a conceptual diagram illustrating an optical operation of the display apparatus of FIG. 18.

FIG. 18 is a cross sectional view illustrating a display apparatus according to still another example embodiment of the present invention. FIG. 19 is a conceptual diagram illustrating operation of the display apparatus of FIG. 18.

The display apparatus according to the present example embodiment is substantially the same as the previous example embodiment of FIG. 13, except that the display apparatus is a transmissive type display in which a display panel 100 is operated in transmissive mode, and the positions of positive A-plate and negative C-plate differ. Thus, any repetitive explanation concerning the same or like elements as those described in the previous example embodiment of FIG. 13 is omitted.

Referring to FIGS. 18 and 19, the first polarizing plate 200 includes a first protective layer 210, a first polarizer 220, a first λ/4 phase difference plate 230, the positive A-plate 240 and the negative C-plate 250. The second polarizing plate 300 includes a low-reflective film 310, a second protective layer 320, a second polarizer 330 and a second λ/4 phase difference plate 340.

The first polarizer 220 is disposed between the first protection layer 210 and the negative C-plate 250. The first polarizer 220 has a first absorptive axis 220a substantially parallel with a first direction D1, and a first polarizing axis 220b substantially parallel with a second direction D2. Here, second direction D2 is substantially perpendicular to the first direction D1. The first polarizer 220 includes a first surface 221 and a second surface 222 opposite to the first surface 221.

The negative C-plate 250 is disposed over the first surface 221 of the first polarizer 220. The negative C-plate 250 includes a compensating axis 250a substantially parallel to the first polarizing axis 220b. A phase delay value Rth of the negative C-plate 250 may be between about 30 nm and about 80 nm in a thickness direction. The negative C-plate 250 includes a first surface 251 facing the first surface 221 of the first polarizer 220, and a second surface 252 opposite to the first surface 251.

The positive A-plate 240 is disposed over the second surface 252 of the negative C-plate 250. The positive A-plate 240 includes a compensating axis 240a substantially parallel with the first polarizing axis 220b. A phase delay value Rth of the positive A-plate 250 may be between about 70 nm and about 140 nm in a thickness direction. The positive A-plate 240 includes a first surface 241 facing the second surface 252 of the negative C-plate 250, and a second surface 242 opposite to the first surface 241.

The first λ/4 phase difference plate 230 is disposed over the second surface 242 of the positive A-plate 240. The first λ/4 phase difference plate 230 has a first delaying axis 230a inclined by an angle of about 45 degrees, or about 135 degrees with respect to the first polarizing axis 220b of the first polarizer 220. The first λ/4 phase difference plate 230 includes a first surface 231 facing the second surface 242 of the positive A-plate 240, and a second surface 232 opposite to the first surface 231. The second surface 232 of the first λ/4 phase difference plate 230 is coupled to second surface 112 of the first substrate 110.

A display panel 100 includes the first substrate 110, a second substrate 130, and a liquid crystal layer 140 disposed between the first substrate 110 and the second substrate 130. A phase delay value Δnd of the liquid crystal layer 140 may be from about 275 nm to about 350 nm at a wavelength of about 550 nm. For example, the phase delay value Δnd of the liquid crystal layer 140 may be about 325 nm. The quantity Δn is an anisotropic refractive index of the liquid crystal layer 140, and d is a cell gap of the liquid crystal layer 140.

The second λ/4 phase difference plate 340 is disposed over the display panel 100. In detail, the second λ/4 phase difference plate 340 is disposed over a second surface 132 of the second substrate 130. The second λ/4 phase difference plate 340 has a second delaying axis 340a substantially perpendicular to the first delaying axis 230a. The second λ/4 phase difference plate 340 includes a first surface 341 facing the second surface 132 of the second substrate 130, and a second surface 342 facing a first surface 331 of the second polarizer 330.

For liquid crystal layer 140 having a phase delay value Δnd from about 275 nm to about 350 nm in a wavelength of about 550 nm, the first and second λ/4 phase difference plates 230 and 340 may have a refractive index nz between about 1.35 and about 2.05 in thickness directions.

The second polarizer 330 is disposed over the second surface 342 of the second λ/4 phase difference plate 340. The second polarizer 330 has a second absorptive axis 330a substantially perpendicular to the first absorptive axis 220a, and a second polarizing axis 330b substantially perpendicular to the second absorptive axis 330a. The second protective layer 320 is attached to the first surface 331, which is opposite to the second surface 332 of the second polarizer 330.

In this exemplary embodiment, the negative C-plate 250 is disposed first, and the positive A-plate 240 is disposed thereafter. However, the invention is not limited to the present example embodiment. For example, the positive A-plate 240 may be disposed first, and the negative C-plate 250 may be disposed later.

According to various example embodiments of the present invention, first and second λ/4 phase difference plates are disposed over and under a display panel, and refractive indexes of the λ/4 phase difference plates are adjusted so as to reduce light leakage in side views. In addition, a compensating film compensating phase difference of a liquid crystal layer can be disposed between a first polarizer (which is disposed under the display panel) and the first λ/4 phase difference plate. The presence of the compensating film reduces light leakage in a side view, and improves viewing angle symmetry. In particular, viewing angle may be made diagonally symmetric. In these respects, embodiments of the invention act to improve display quality.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A polarizing plates set comprising:
   a first linear polarizer having a first linear polarizing axis extending in a first lateral direction, the first lateral direction being part of a lateral plane also having a second lateral direction different from the first lateral direction;
   a first λ/4 phase difference plate disposed over the first polarizer and having a refractive index (nz) between about 1.35 and about 2.05 in a thickness direction thereof, the thickness direction being orthogonal to the lateral plane;

a second linear polarizer having a second linear polarizing axis extending in the second lateral direction, the second polarizer being disposed above and spaced apart from the first linear polarizer and also from the first λ/4 phase difference plate; and a second λ/4 phase difference plate disposed under the second polarizer, above the first λ/4 phase difference plate, and having a refractive index (nz) in a thickness direction of the second λ/4 phase difference plate which is essentially the same as that of the first λ/4 phase difference plate, wherein the refractive index (nz) of the first and second λ/4 phase difference plates is between about 1.65 and about 1.75.

2. The polarizing plates set of claim 1, further comprising a first compensating film disposed between the first polarizer and the first λ/4 phase difference plate.

3. The polarizing plates set of claim 2, wherein the first compensating film is a positive A-plate, and a phase delay value of the positive A-plate is between about 70 nm and about 140 nm in a thickness direction.

4. The polarizing plates set of claim 2, wherein the first compensating film is a negative C-plate, and a phase delay value of the negative C-plate is between about 30 nm and about 80 nm in a thickness direction.

5. A display apparatus comprising:
a display panel comprising:
a first substrate including a pixel electrode;
a second substrate opposite to the first substrate; and
a liquid crystal layer disposed between a first surface of the first substrate and a first surface of the second substrate;
a first polarizing plate comprising:
a first polarizer disposed under a second surface of the first substrate and having a first polarizing axis; and
a first λ/4 phase difference plate disposed between the second surface of the first substrate and the first polarizer and having a refractive index between about 1.35 and about 2.05 in a thickness direction; and
a second polarizing plate comprising:
a second polarizer disposed over a second surface of the second substrate and having a second polarizing axis crossing the first polarizing axis; and
a second λ/4 phase difference plate disposed between the second surface of the second substrate and the second polarizer and having a refractive index which is essentially the same as that of the first λ/4 phase difference plate in a thickness direction,
wherein the refractive index (nz) of the first λ/4 phase difference plate and the second λ/4 phase difference plate is between about 1.65 and about 1.75.

6. The display apparatus of claim 5, wherein a phase delay value of the liquid crystal layer is from about 275 nm to about 350 nm at a wavelength of about 550 nm.

7. The display apparatus of claim 6, wherein the first polarizing plate further comprises a compensating film disposed between the first polarizer and the first λ/4 phase difference plate so as to compensate for a phase difference generated by the liquid crystal layer.

8. The display apparatus of claim 7, wherein the compensating film is a positive A-plate, and a phase delay value of the positive A-plate is between about 70 nm and about 140 nm in a thickness direction.

9. The display apparatus of claim 7, wherein the compensating film is a negative C-plate, and a phase delay value of the negative C-plate is between about 30 nm and about 80 nm in a thickness direction.

* * * * *